United States Patent [19]
Suzuki et al.

[11] Patent Number: 5,619,089
[45] Date of Patent: Apr. 8, 1997

[54] ULTRASONIC MOTOR AND ELECTRONIC APPARATUS PROVIDED WITH AN ULTRASONIC MOTOR

[75] Inventors: Kenji Suzuki; Makoto Suzuki; Masao Kasuga; Minako Suzuki; Akihiro Iino, all of Chiba, Japan

[73] Assignee: Seiko Instruments Inc., Japan

[21] Appl. No.: 662,902

[22] Filed: Jun. 12, 1996

Related U.S. Application Data

[63] Continuation of Ser. No. 574,577, Dec. 14, 1995, abandoned, which is a continuation of Ser. No. 332,123, Oct. 31, 1994, abandoned.

[51] Int. Cl.$^6$ ............................................. H02N 2/00
[52] U.S. Cl. ................................. 310/323; 310/316
[58] Field of Search ................................. 310/316, 317, 310/323; 318/116

[56] References Cited

U.S. PATENT DOCUMENTS

| | | | |
|---|---|---|---|
| 5,079,470 | 1/1992 | Kasuga et al. | 310/323 |
| 5,300,850 | 4/1994 | Okumura et al. | 310/323 |
| 5,402,030 | 3/1995 | Mukohjima | 310/323 |
| 5,408,156 | 4/1995 | Kawasaki et al. | 310/323 |

FOREIGN PATENT DOCUMENTS

| | | | |
|---|---|---|---|
| 0426042 | 5/1991 | European Pat. Off. | 310/323 |
| 0087911 | 7/1981 | Japan | 310/316 |

*Primary Examiner*—Thomas M. Dougherty
*Attorney, Agent, or Firm*—Adams & Wilks

[57] ABSTRACT

An ultrasonic motor comprises a piezo-electric element and electrode patterns disposed on a surface of the piezo-electric element at nearly equal intervals in a multiple of four. A vibrating member is disposed on another surface of and electrically connected to the piezo-electric element. A moving member is movably disposed on the vibrating member. First projections which frictionally drive the moving member by expansion and contraction movement of the piezo-electric element are disposed on a surface of the vibrating member near every other one of the boundaries of the electrode patterns of the piezo-electric element. Second projections are provided at each intermediate position between the first projections near all of the boundaries of the electrode patterns other than the boundaries near which the first projections are provided for adjusting the vibrating conditions of the vibrating member. The second projections have a different height from the first projection and do not frictionally drive the moving member. A pressure-regulating member urges the moving member into pressure contact with the vibrating member at a predetermined pressure.

23 Claims, 30 Drawing Sheets

5,619,089

ULTRASONIC MOTOR AND ELECTRONIC APPARATUS PROVIDED WITH AN ULTRASONIC MOTOR

This is a continuation of application Ser No. 08/574,577 filed Dec. 14, 1995 now abandoned which is a continuation of application Ser. No. 08/332,123 filed Oct. 31, 1994 now abandoned.

BACKGROUND OF THE INVENTION

The present invention relates to ultrasonic motors and electronic apparatus provided with an ultrasonic motor wherein a moving member is driven through friction using a vibrating wave generated by utilizing the piezo-electric effects of a piezo-electric element.

Conventionally, an ultrasonic motor has a constitution in which projections 107 are provided on a vibrating member 101 near every other one of the boundaries of electrode patterns 104a and 104b to transmit power to a moving member, as is shown in FIGS. 29 and 30. For example, an ultrasonic motor of such a constitution is disclosed in the official report as Japanese Patent laid open JP-A-63-69472 (1988).

An ultrasonic motor of a constitution in which projections are provided on a vibrating member near every other one of the boundaries of the electrode patterns to transmit power to a moving member can be driven with a single driving signal, and in this regard has the advantage over conventional ultrasonic motors of the traveling wave type which are common. However, seeing the positions of the projections on the vibrating member within a cycle of a wavelength of a wave generated in the vibrating member, the projections are positioned with offset, causing imbalance in the vibrating member. Accordingly, vibration characteristics of the vibrating member are easily affected by changes in temperature, driving voltage or the conditions of pressure applied to the moving member. As a result, there has been a problem in that stable driving of the motor is rather difficult and thus the control circuit for the motor has become very complicated.

SUMMARY OF THE INVENTION

An object of the present invention is, therefore, to provide an ultrasonic motor which can be driven with a single driving signal, is hardly affected by environmental changes, and has excellent stability.

In order to solve the above-mentioned problems with the ultrasonic motor, an ultrasonic motor according to the present invention is created which is hardly affected by environmental changes and has excellent stability, such ultrasonic motor being of a constitution comprising:

a piezo-electric element on which a plurality of almost equal electrode patterns are formed on one plane or surface thereof, a vibrating member connected to the other plane or surface of the piezo-electric element, opposite to the plane on which the electrode patterns are formed, and which electrically connects to the piezo-electric element, projections which are arranged on one plane or surface of the vibrating member near every other one of the boundaries of the electrode patterns for transmitting power to the moving member, low projections which are arranged at each intermediate positions between projection to adjust vibration conditions of the vibrating member, the low-projections having a height different from that of the projections and do not transmit power to a moving member, and pressure regulating means so positioned that the moving member is in contact with the vibrating member at a predetermined pressure.

A block diagram of the ultrasonic motor composed as described above is shown in FIGS. 1 and 2. Referring to FIG. 1, electrode patterns 103a and 103b are formed on a first surface of a piezo-electric element 102 in a multiple of 4 at almost equal intervals. Polarization is reversed alternately for each pair of two neighboring electrode patterns 103a and 103b on the piezo-electric element. A first circuit or leading means 104a and a second circuit or leading means 104b short-circuit every other electrode pattern respectively to form two groups of electrode patterns 103a and 103b. A vibrating member is connected to the other plane or second surface of the piezo-electric element opposite to the plane where electrode patterns are formed, and is electrically connected to the piezo-electric element. On one plane of the vibrating member 101 having piezo-electric element 102, projections 107 are arranged near every other one of the boundaries of electrode patterns 103a and 103b to transmit power to a moving member 108. Low projections 100 are arranged between each projection 107 to adjust vibration conditions without transmitting power to the moving member 108.

The moving member 108 is so positioned as to be in contact with the vibrating member 101 via projections 107 at a predetermined pressure due to a pressure regulating member 109.

A driving circuit 113 outputs a driving signal to the electrode pattern 103a which is short-circuited by the first leading means.

Referring to the block diagram of FIG. 2, the driving circuit 113 outputs a driving signal to the electrode pattern 103b which is short-circuited by the second leading means, causing the ultrasonic motor to rotate in the opposite direction to that of FIG. 1.

DETAILED DESCRIPTION OF THE PREFERRED EMBODIMENTS

Preferred embodiments of the present invention will now be described with reference to the drawings.
(1) First Embodiment FIGS. 3 and 4 are a plane view and a vertical section view, respectively, of a vibrating member of an ultrasonic motor according to a first embodiment of the present invention.

Figure 3:
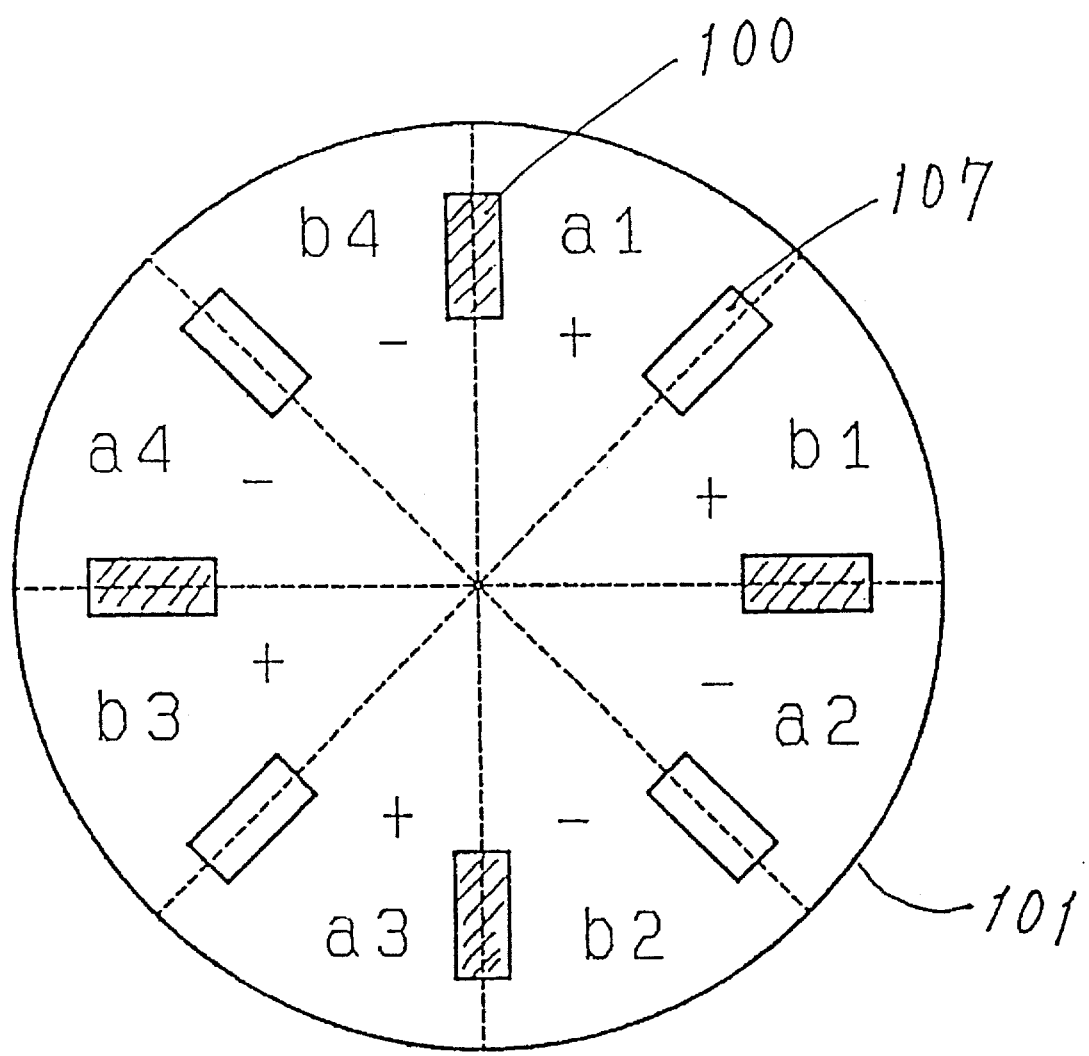
FIG. 3 is a plane view of a vibrating member of an ultrasonic motor according to a first embodiment of the present invention.
Figure 4:
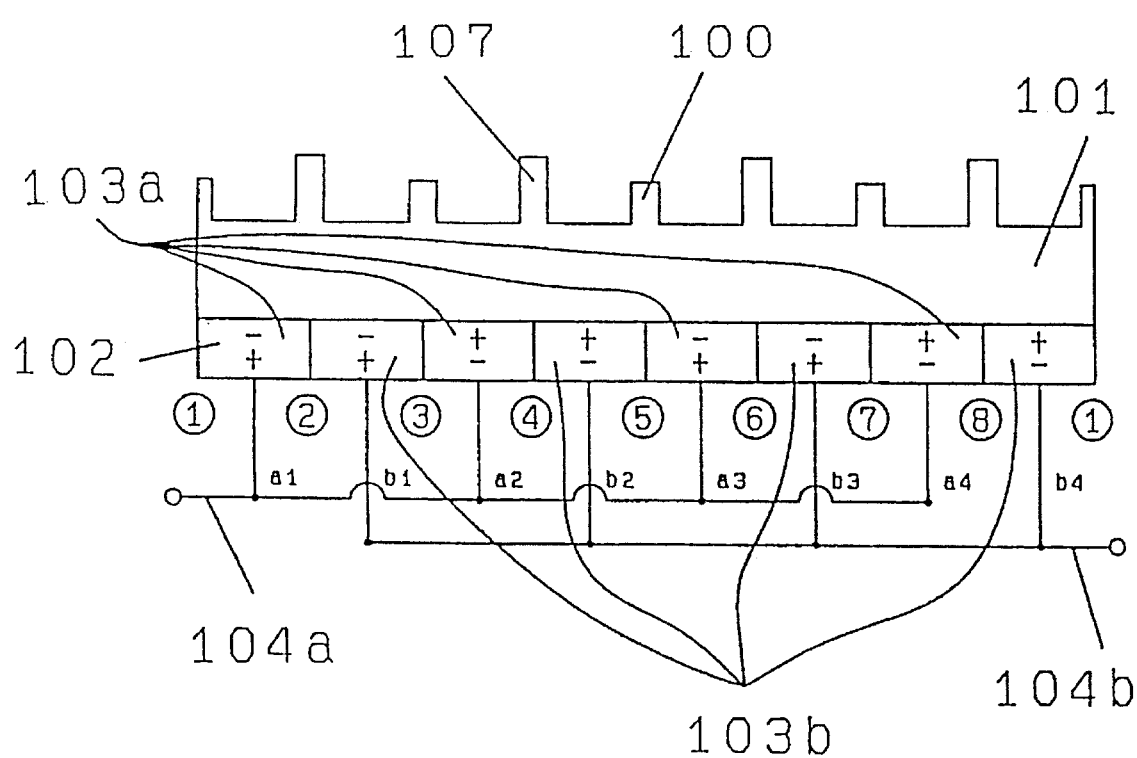
FIG. 4 is a vertical section view of the vibrating member of the ultrasonic motor according to the first embodiment of the present invention.

In FIG. 3 and FIG. 4, a disc-shaped piezo-electric element 102 is adhered or joined by thin film forming means or the like to the plane or surface of a disc-shaped vibrating member 101. In this embodiment, the piezo-electric element 102 is divided into 8 segments in the circumferential direction, on which a first electrode pattern 103a and a second electrode pattern 103b are formed on every other sector and positively (+) and negatively (−) polarized respectively as shown in the figure. The first electrode pattern 103a is composed of divided patterns a1, a2, a3 and a4, each divided pattern being short-circuited by a first circuit or leading means 104a. The second electrode pattern 103a is composed of divided patterns b1, b2, b3 and b4, each divided pattern being short-circuited by a second circuit leading means 104b. In the figure, the signs (+) and (−) represent the direction of polarization which has been set up by applying positive and negative electric fields to the piezo-electric elements 102 on the plane joined to the vibrating member 101.

A vibrating member 101 is joined to the other plane opposite to the plane on which electrode patterns 103a and 103b are formed, and is electrically connected to the piezo-electric elements 102.

An electrical conductivity may be obtained from the vibrating member 101, but also can be obtained from the piezo-electric element 102.

Instead of a disc-shaped piezo-electric element divided into segments on which electrode patterns are formed as described above, a plurality of segment-shaped piezo-electric elements may be arranged and adhered to the plane of the vibrating member to form a disc shape. Projections 107 are arranged on a plane or surface of the vibrating member 101 near every other one of the boundaries of electrode patterns 103a and 103b to transmit power. At the boundaries of electrode patterns of 103a and 103b except the boundaries near which projections 107 are provided, low projections 100 having the same shape as the projections 107 but a lower height than the projections 107 are further provided.

Figure 5:
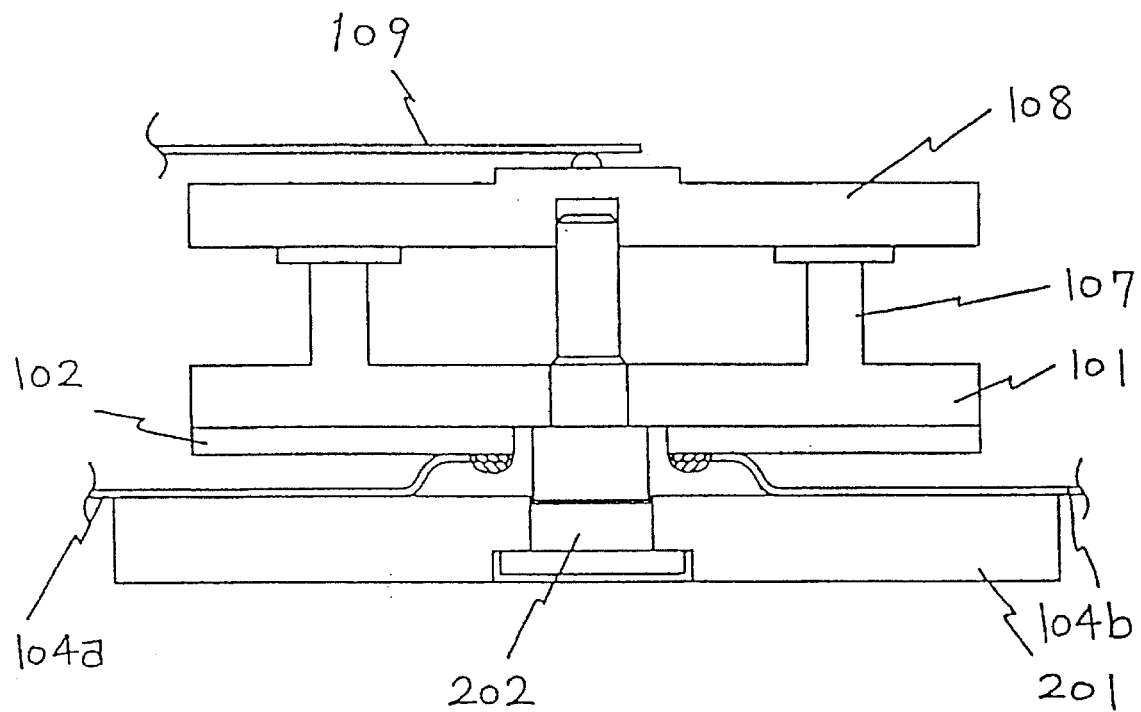
FIG. 5 is a vertical section view of the ultrasonic motor according to the first embodiment of the present invention.

FIG. 5 is a vertical section view of the ultrasonic motor according to the first embodiment of the present invention.

In FIG. 5, a center shaft 202 is fixed to a fixing table 201. The vibrating member 101 to which the piezo-electric element 102 is adhered is fixed and supported near a center portion thereof by the center shaft 202 to be integral with the fixing table 201. A moving member 108 is guided for rotation by the center shaft 202, and is in contact with the vibrating member 101 via the projections 107 at a predetermined pressure 107 due to a pressure regulating spring which is fixed and supported at its one end to an external part which is not shown in the figure.

The operation principle of the ultrasonic motor according to the present invention will now be explained with reference to FIGS. 6 through 10.

Figure 6:
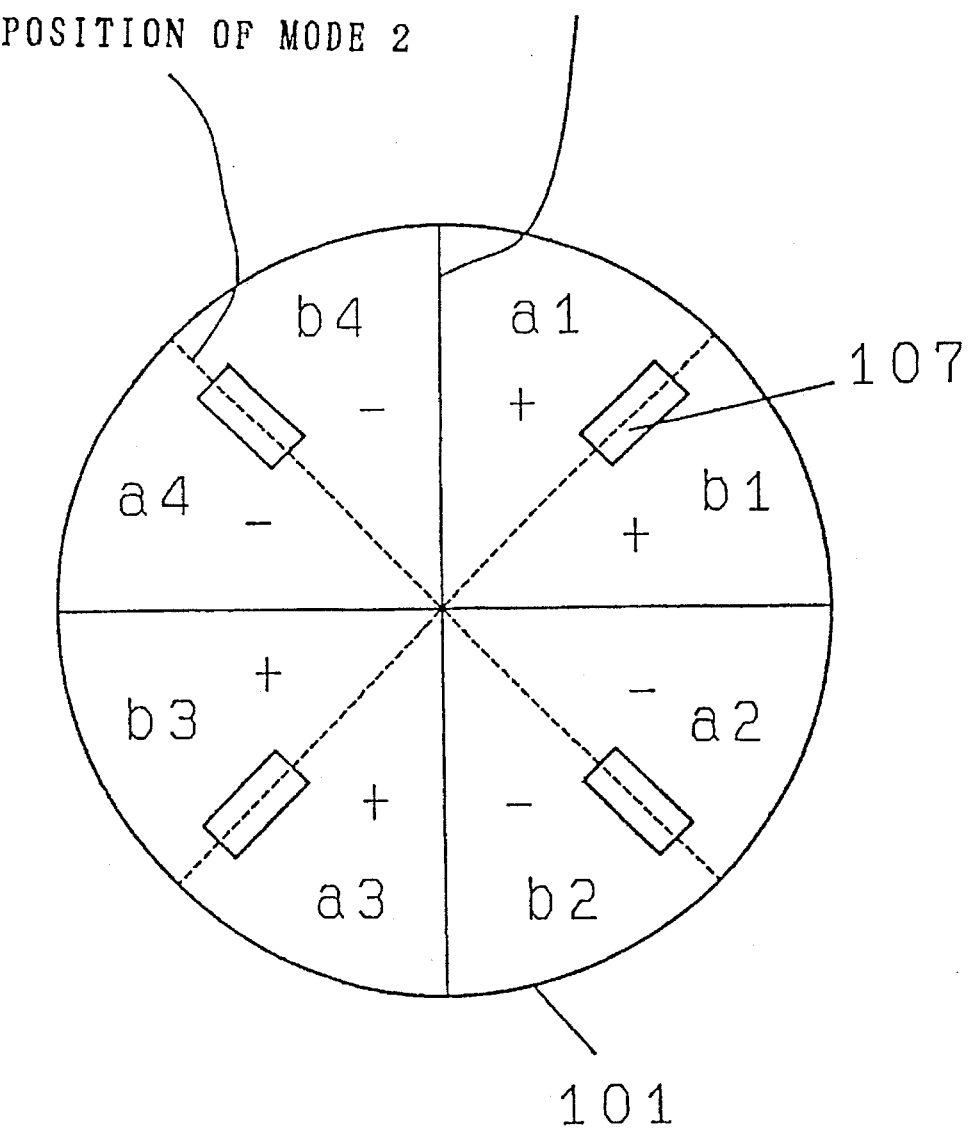
FIG. 6 is a diagram illustrating the operation principle of an ultrasonic motor according to the present invention.
Figure 7:
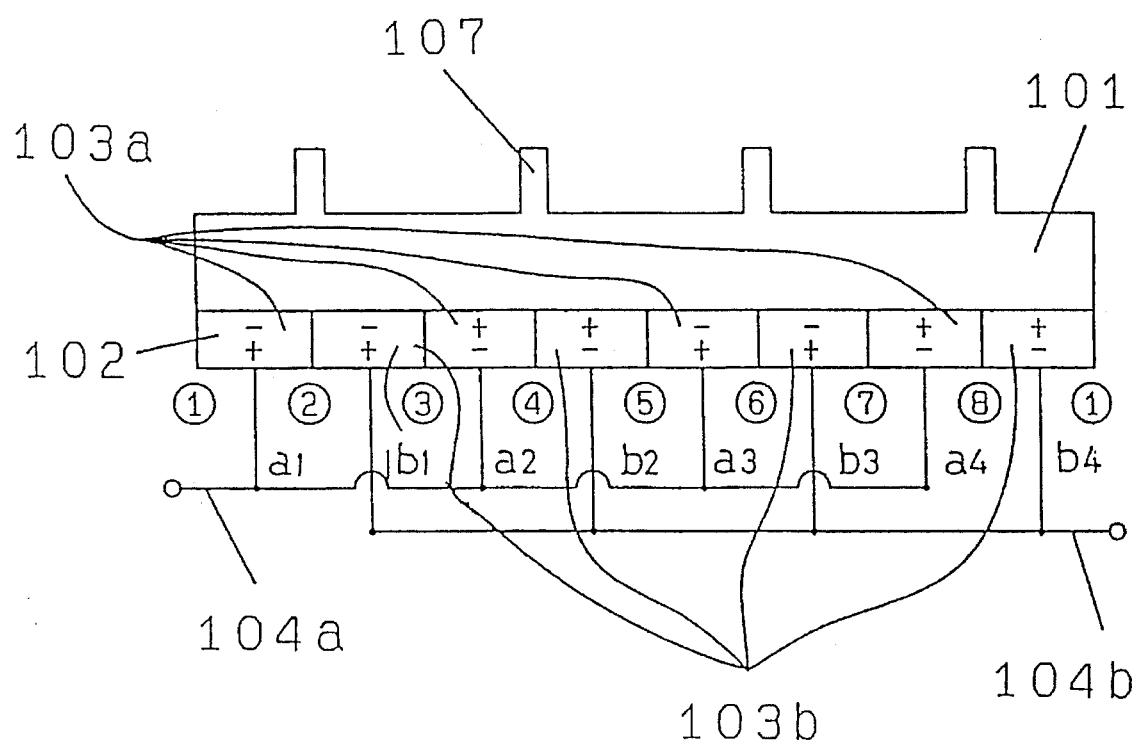
FIG. 7 is a diagram illustrating the operation principle of an ultrasonic motor according to the present invention.

When a driving signal is input to an electrode pattern 103a from a driving circuit 113 which is not shown in the figures, flexural standing waves of the primary and secondary modes, which are two contraction modes, are oscillated in the vibrating member 101 and the piezoelectric element 102, as shown in FIGS. 6 and 7. Full lines and broken lines in the figures represent nodal positions in the circumferential direction of the primary and secondary modes of the flexural standing wave, respectively.

When the projections 107 are located at the position shown in FIG. 6 and FIG. 7, the projections 107 are at the position of the loops of the flexural standing wave of the primary mode, and are positioned at the nodal positions of the flexural standing wave of the secondary mode. At the tip of the projections 107, displacement in the vertical direction relative to the plane of the vibrating member 101 is generated by the primary-mode wave, and displacement in the horizontal direction relative to the plane of the vibrating member 101 is generated by the secondary-mode wave.

When the projections 107 with these displacements are brought into contact with the moving member 108 at a predetermined pressure by a pressure regulating spring 109 which is not shown in the figures, the movement of projections 107 are transmitted to the moving member 108 through friction, and the moving member is rotated in one direction.

Figure 8:
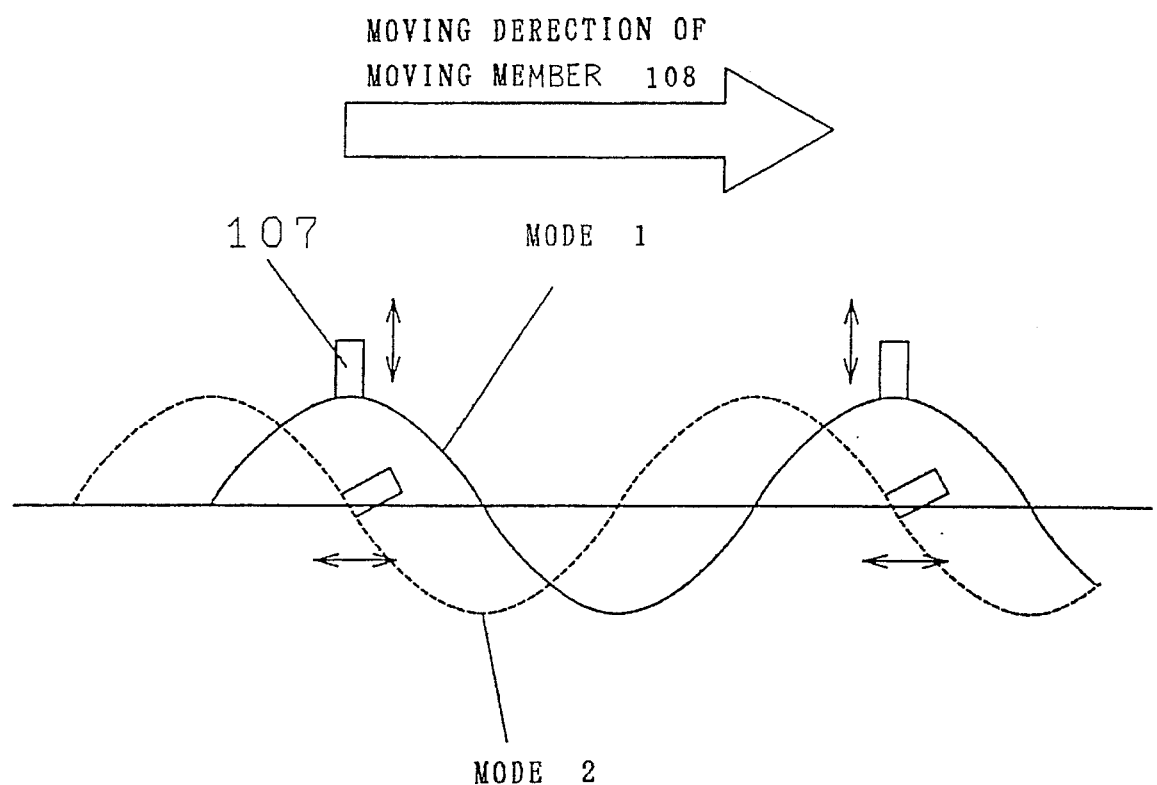
FIG. 8 is a diagram illustrating the operation principle of an ultrasonic motor according to the present invention.
Figure 10:
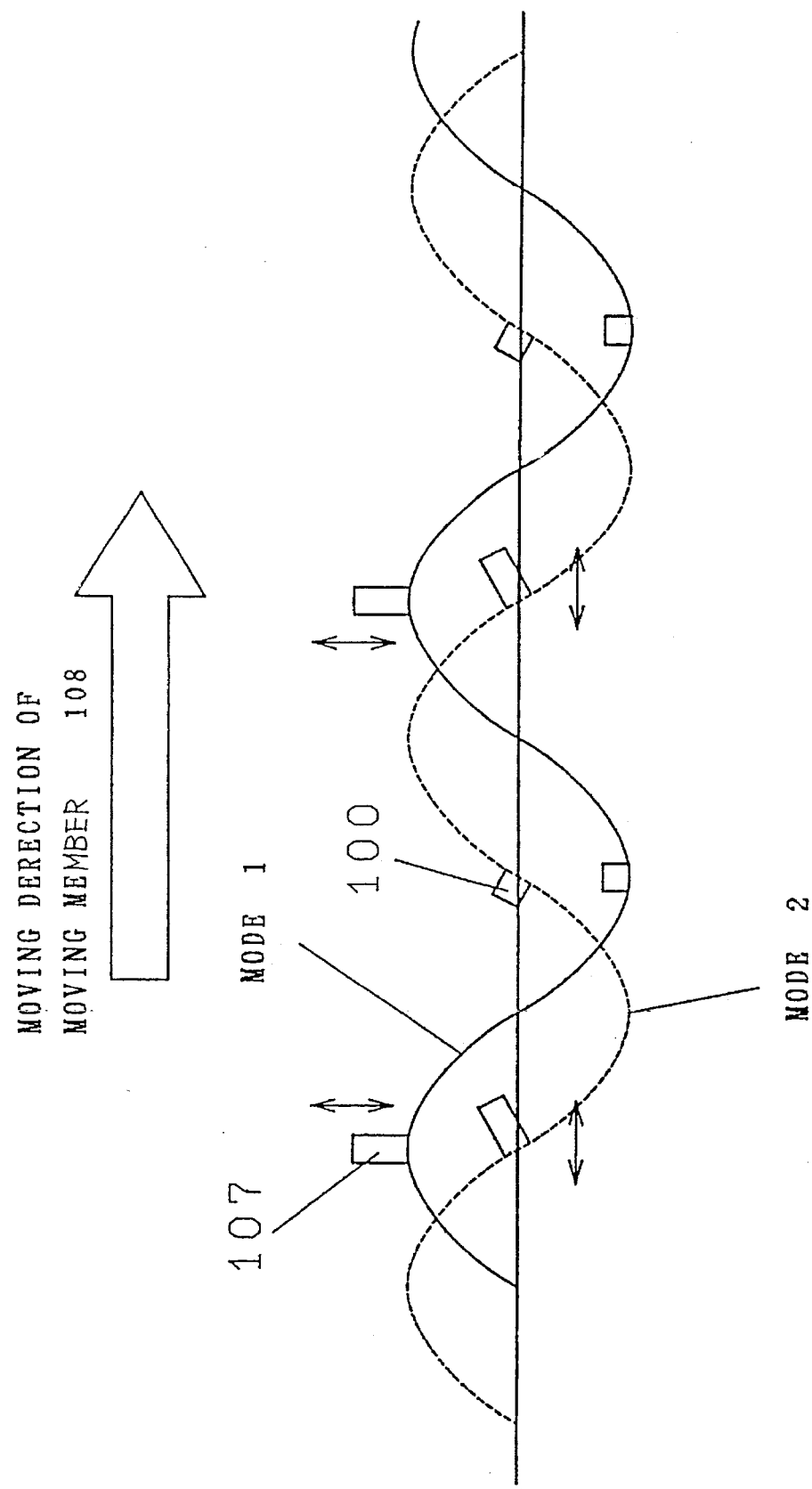
FIG. 10 is a diagram illustrating the operation principle of an ultrasonic motor according to the present invention.

However, as shown in FIGS. 6 through 8, since the projections 107 are arranged near every other one of the boundaries of the electrode patterns 103a and 103b, the projections 107 are located with offset with respect to the flexural standing waves, resulting in imbalance and unstable vibration condition. In an ultrasonic motor according to the present invention, vibration conditions of the vibrating member 101 are stabilized by providing low projections 100 having the same shape as but a lower length than the projections 107 at positions which are symmetrical with the projections 107 in respect of waves as shown in FIG. 10. That is, the low projections 100 are disposed near every other one of the boundaries of electrode patterns 103a and 103b other than the positions near which the projections 107 are provided to adjust vibration conditions without transmitting power to the moving member 108.

Figure 9:
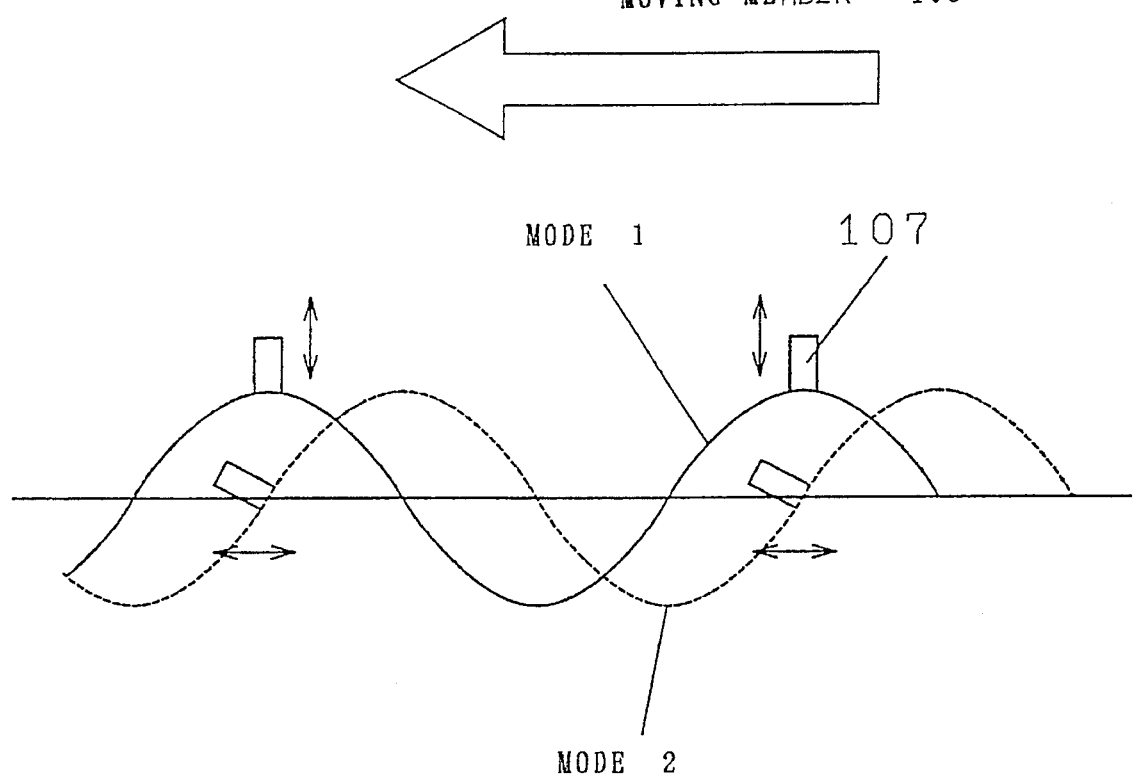
FIG. 9 is a diagram illustrating the operation principle of an ultrasonic motor according to the present invention.

When a driving signal outputted from a driving circuit 113 which is not shown in the figure is input to the electrode pattern 103b, relative positional relationship between the flexural standing waves of the primary mode and the secondary mode and the projections 107 is as shown in FIG. 9, and the moving member rotates in the direction opposite to the direction in the previous case.

Figure 11:
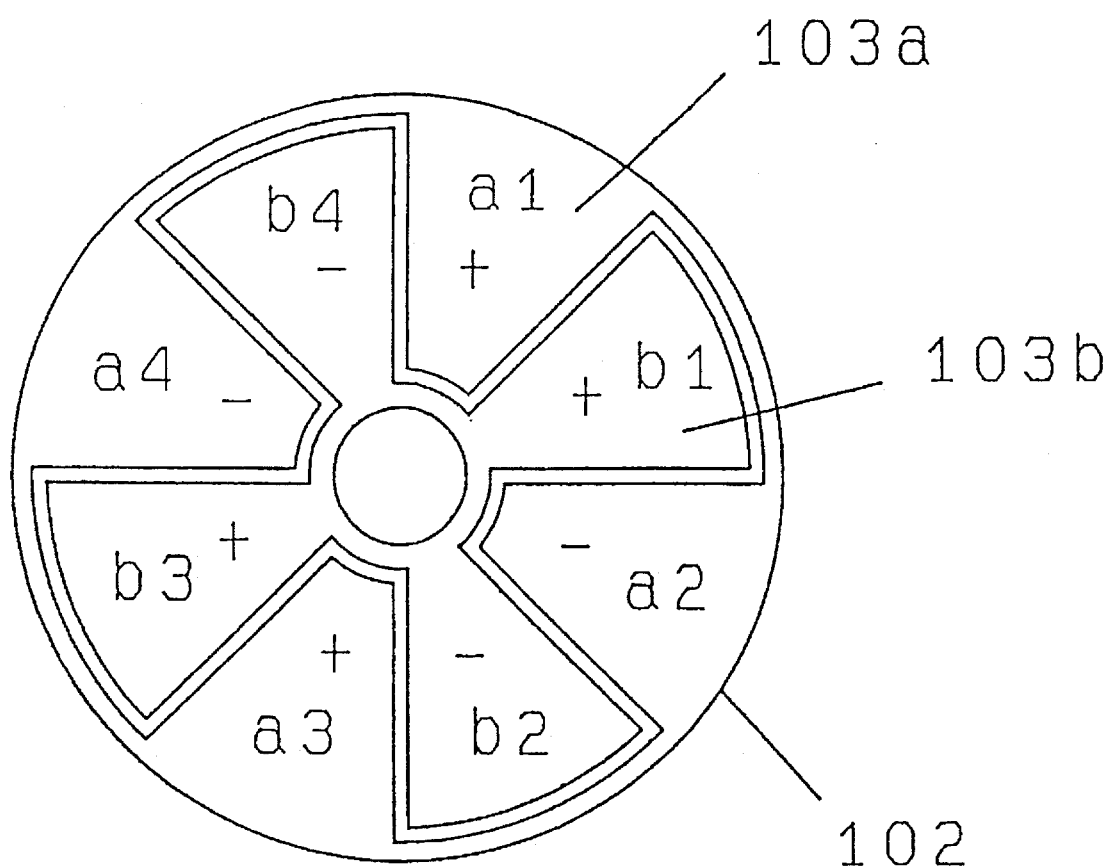
FIG. 11 is a diagram of the electrode patterns of a piezoelectric element of the ultrasonic motor according to the first embodiment of the present invention.

FIG. 11 shows electrode patterns of the piezo-electric element 102 according to the first embodiment of the present invention.

In this embodiment, as electrode patterns have been divided in the circumferential direction into patterns of quadruple the number of waves desired to be oscillated, it is necessary to connect every other pattern. However, connecting the electrode patterns by use of lead wire requires soldering or welding on all the divided patterns, and may cause leakage of vibration or increased losses and also may lead to problems during the manufacturing process. To avoid these problem, electrode patterns with eight segments are formed on the piezo-electric element 102 by thin film forming means such as vapor deposition, spattering or printing, and then they are polarized as shown in FIG. 11. After that, by means of the same thin-film formation, the electrode patterns are connected at every other pattern of divided segments to form a first electrode pattern 103a and a second electrode pattern 103b. By forming electrode patterns 103a and 103b in this way, two lead lines are always sufficient for applying driving signal regardless of the number of waves.

(2) Second Embodiment

Figure 12:
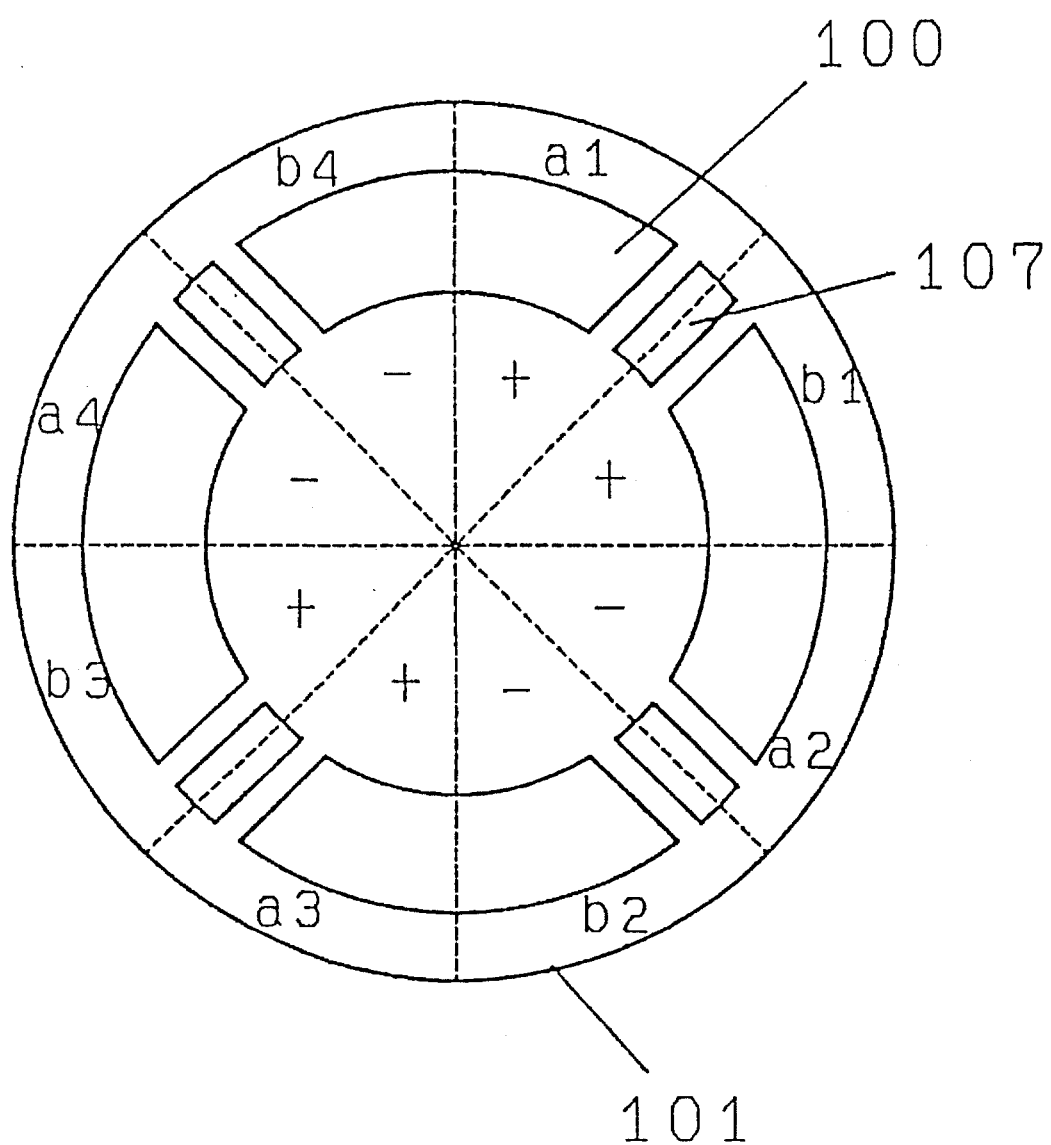
FIG. 12 is a plane view of a vibrating member of an ultrasonic motor according to a second embodiment of the present invention.
Figure 13:
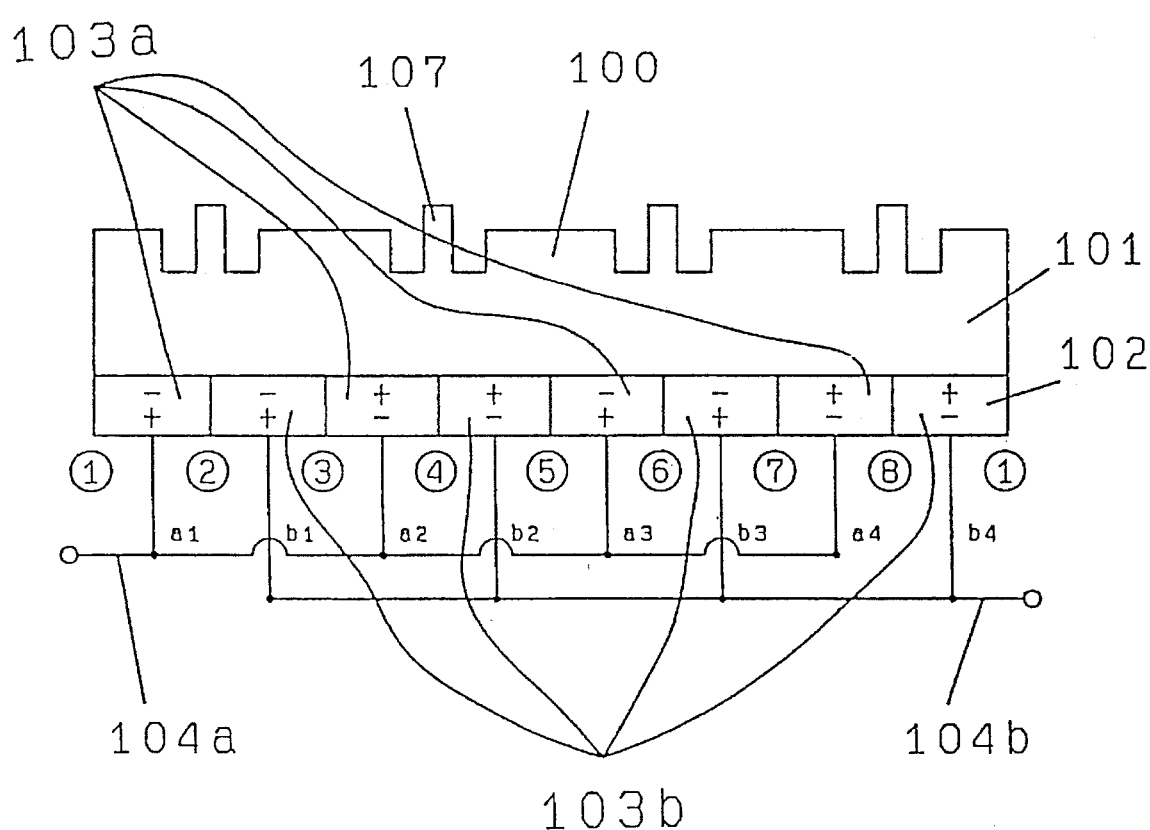
FIG. 13 is a vertical section view of the vibrating member of an ultrasonic motor according to the second embodiment of the present invention.

FIGS. 12 and 13 are a plane view and a vertical section view respectively of a vibrating member of an ultrasonic motor according to a second embodiment of the present invention.

In FIG. 12 and FIG. 13, a disc-shaped piezo-electric element is adhered to or joined by thin film forming means or the like to a plane of the disc-shaped vibrating member 101. The piezo-electric element 102 is the one shown in FIG. 11, which is divided into 8 segments in the circumferential direction and on which a first electrode pattern 103a and a second electrode pattern 103b are formed.

Projections 107 are provided near every other one of the boundaries of electrode patterns 103a and 103b on the plane of vibrating member 101 to transmit power. Arcuate projections 100, which are lower than the projections 107, are provided at each intermediate position between projections 107 to adjust vibration conditions without transmitting power to a moving member 108.

By arranging the arcuate projections 100 between each projection 107 in this way, a ring-shaped projection which is even in the circumferential direction is formed, thereby more stable vibration conditions can be obtained in comparison with a vibrating member 101 on which only projections 107 are spaciously provided. In addition, when manufacturing a vibrating member through the conventional cutting and processing method, this type of shape for the low projections is very effective.

(3) Third Embodiment

Figure 14:
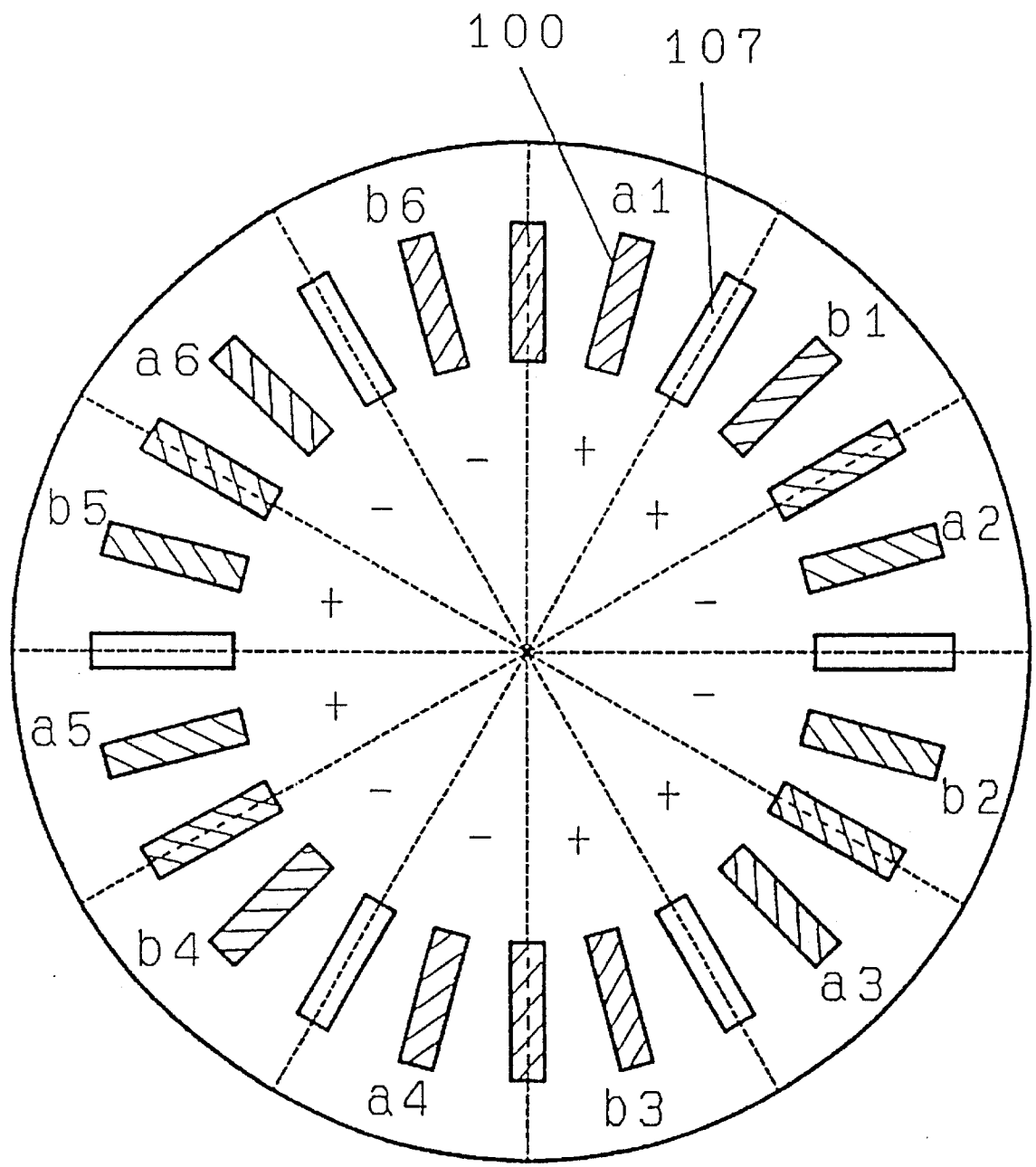
FIG. 14 is a plane view of the vibrating member of the ultrasonic motor according to the second embodiment of the present invention.
Figure 15:
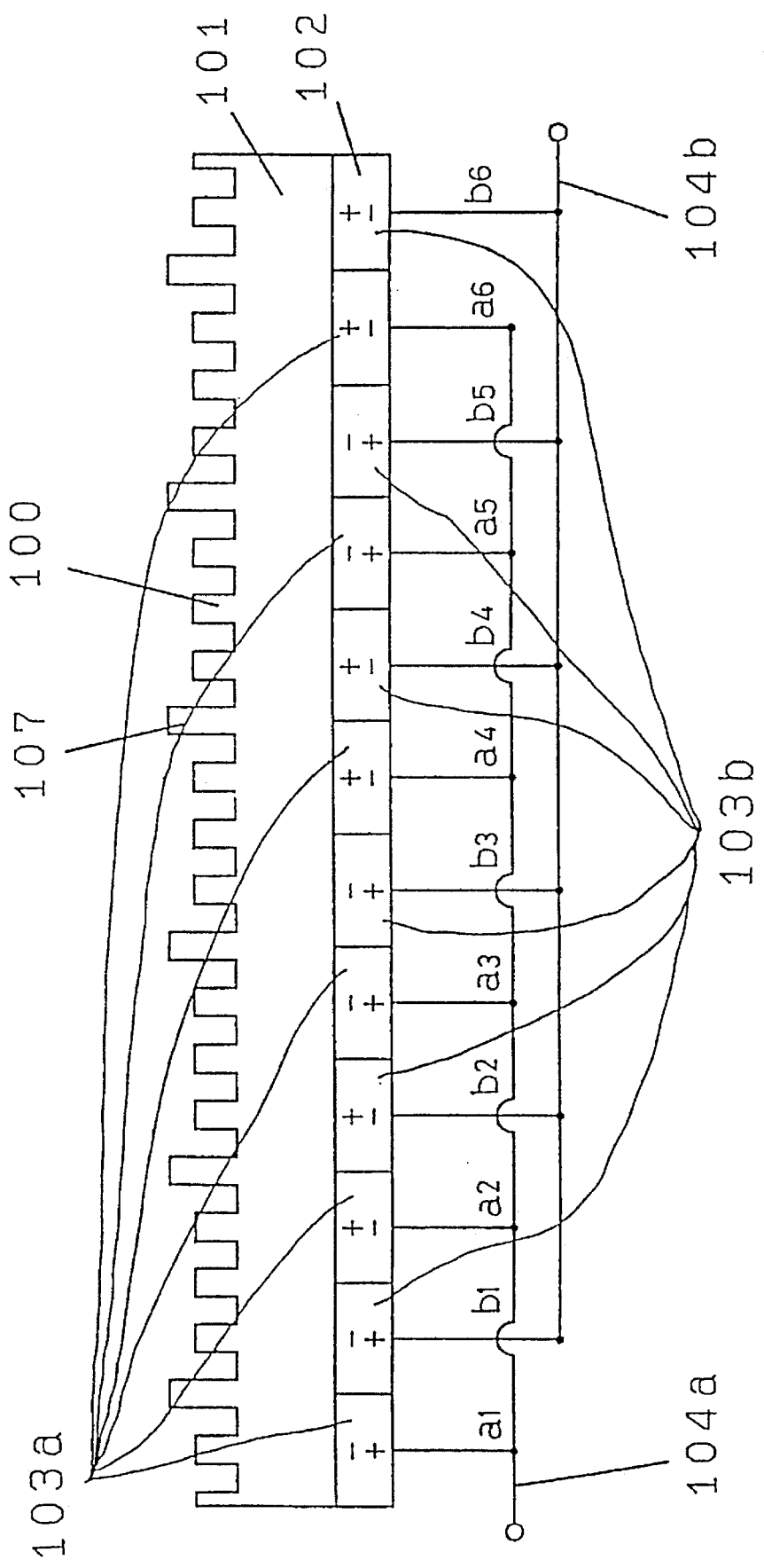
FIG. 15 is a vertical section view of a vibrating member of an ultrasonic motor according to a third embodiment of the present invention.

FIGS. 14 and 15 are a plane view and a vertical section view respectively of a vibrating member of an ultrasonic motor according to a third embodiment of the present invention. In FIG. 14 and FIG. 15, projections 107 are arranged near every other one of the boundaries of electrode patterns 103a and 103b on a plane of vibrating member 101 to transmit power. Three projections 100, lower than projections 107, are further provided at each intermediate position between projections 107 with equal intervals to adjust vibration conditions without transmitting power to the moving member 108.

Figure 16:
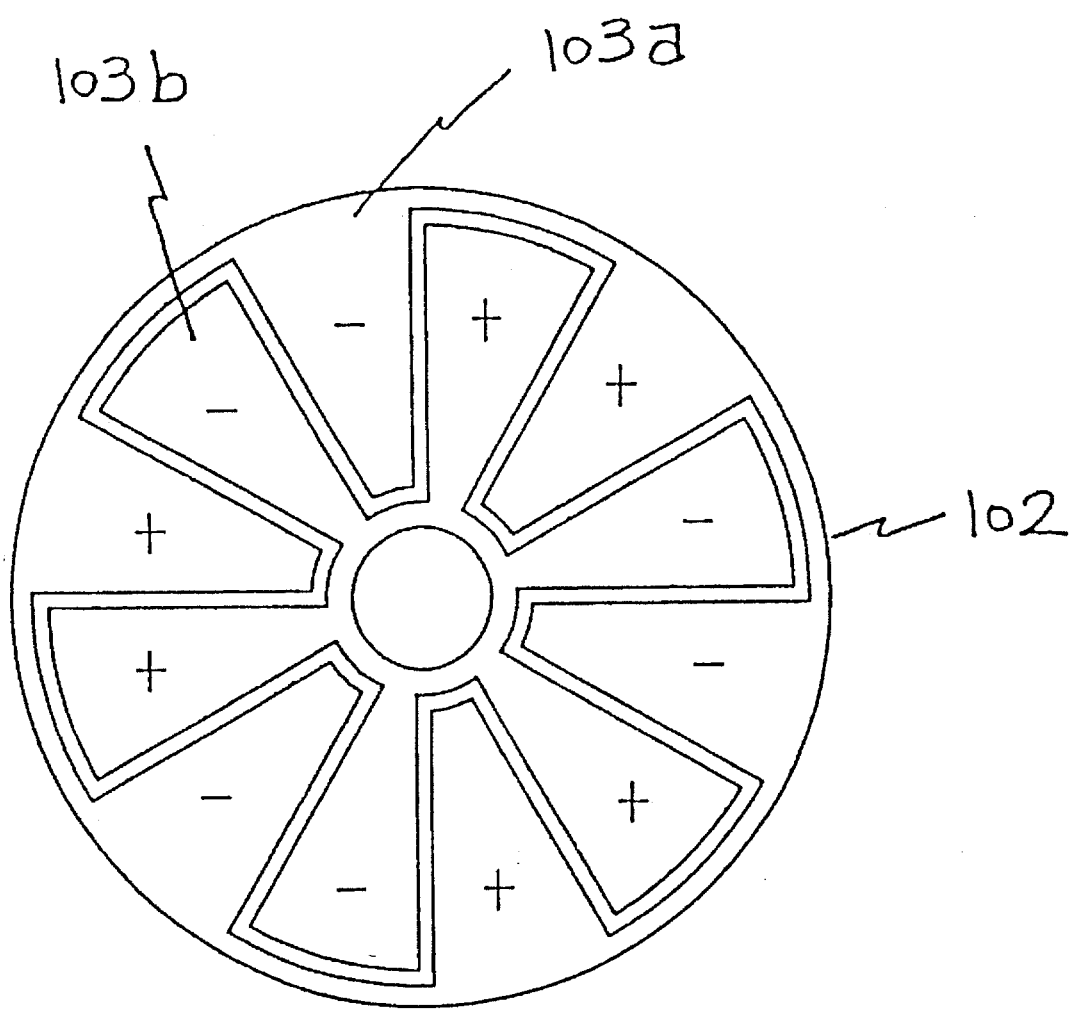
FIG. 16 is a diagram of electrode patterns of a piezoelectric element of the ultrasonic motor according to the third embodiment of the present invention.

FIG. 16 is an electrode pattern diagram of a piezo-electric element of the vibrating member of the ultrasonic motor according to the third embodiment of the present invention. In FIG. 16, the piezo-electric element 102 is divided into 12 segments in the circumferential direction, and every other segment forms a first electrode pattern 103a and a second electrode pattern 103b alternately. Although the number of division of the piezo-electric element is twelve, the method of connecting electrode pattern 103a and electrode pattern 103b is the same as the piezo-electric element with eight divided segments which is used in the first and second embodiments.

In the case where a large number of waves are desired to be oscillated by the vibrating member, as the number of projections 107 to transmit power increases, by arranging a plurality of projections 100 lower than the projections 107 at each intermediate position between projections 107, such lower projections being designed to adjust vibration conditions but not to transmit power to the moving member 108, a ring-shaped projection apparently even in the circumferential direction is formed on the plane of the vibrating member 101, in the same way as belt-like projections 100 of the second embodiment are arranged. At the same time, if an odd number of projections 100 are arranged between projections 107, all the positions near the boundaries of electrode patterns 103a and 103b are filled with projections 107 and projections 100, resulting in improved balance of projection positions in relation with waves oscillated by the vibrating member 101 as well as more stable vibration conditions. Therefore, although three projections for adjusting the vibration condition are provided between projections 107 according to the third embodiment, the number can be any odd number instead of three, and the number is preferably selected considering among other things the method for shape processing.

(4) Fourth Embodiment

Figure 17:
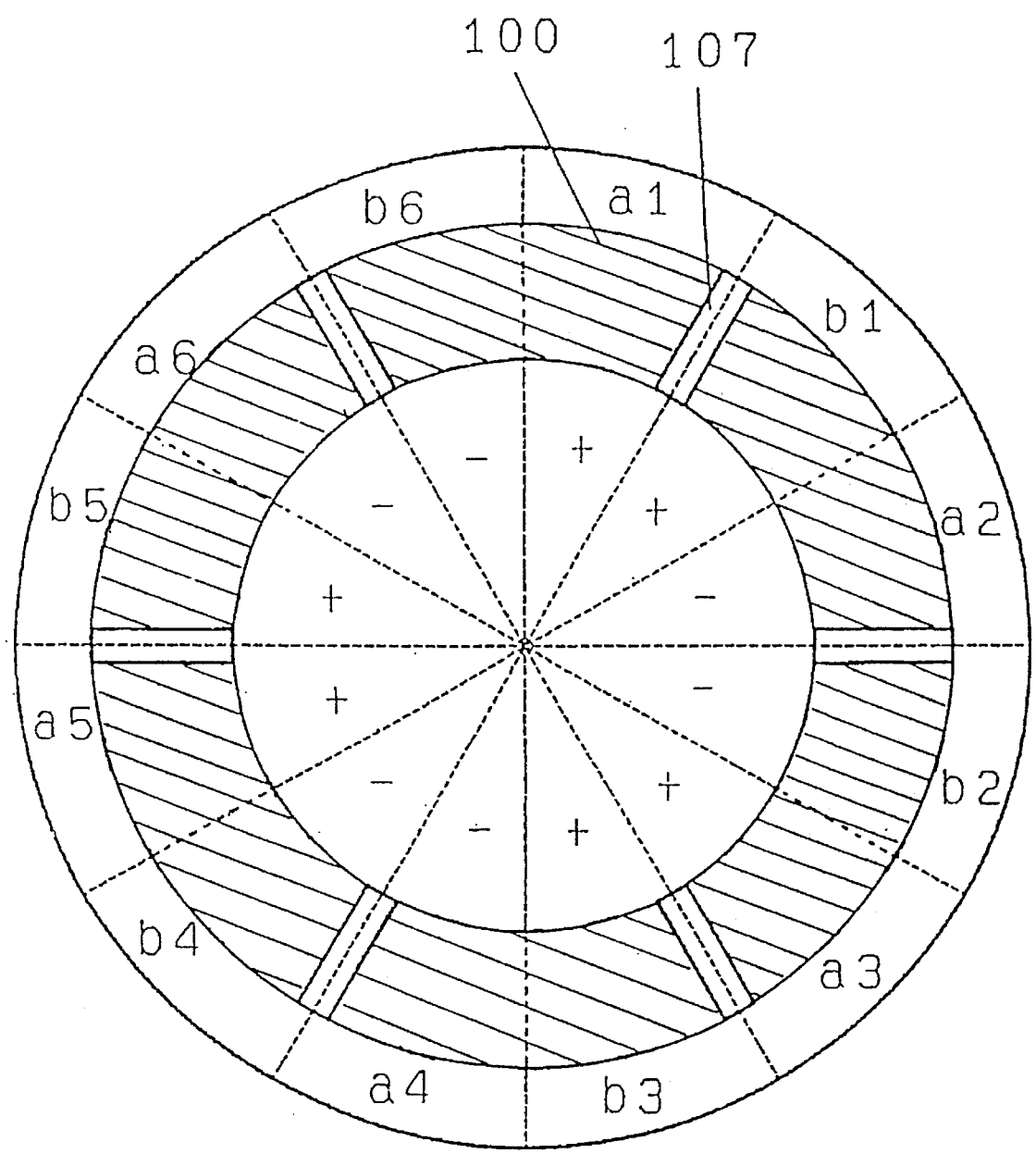
FIG. 17 is a plane view of a vibrating member of an ultrasonic motor according to a fourth embodiment of the present invention.
Figure 18:
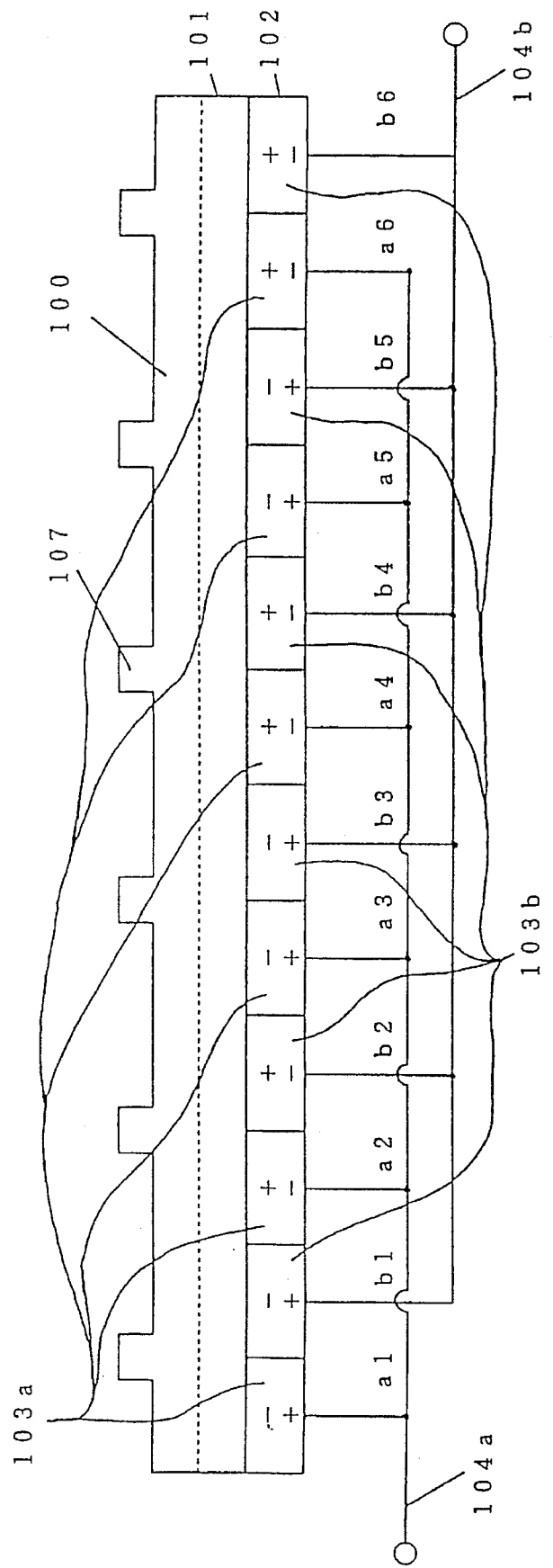
FIG. 18 is a vertical section of the vibrating member of the ultrasonic motor according to the fourth embodiment of the present invention.

FIGS. 17 and 18 are a plane view and a vertical section view respectively of a vibrating member of an ultrasonic motor according to a fourth embodiment of the present invention.

In FIG. 17 and FIG. 18, projections 107 are provided to transmit power near every other one of the boundaries of the electrode patterns 103a and 103b on a plane of a vibrating member 101. Belt-like low projections 100 with lower height than the projections 107 and having an even cross-sectional shape in the circumferential direction are provided at each intermediate position between projections 107, contributing to the adjustment of vibration conditions but not transmitting power to a moving member 108.

Electrode patterns of a piezo-electric element 102 are exactly the same as that used in the third embodiment.

Belt-like low projections 100 of the fourth embodiment are relatively simple in their shape in comparison with low projections in the first through third embodiments, which provides a great advantage during the manufacture of the vibrating member 101.

(5) Fifth Embodiment

Figure 19:
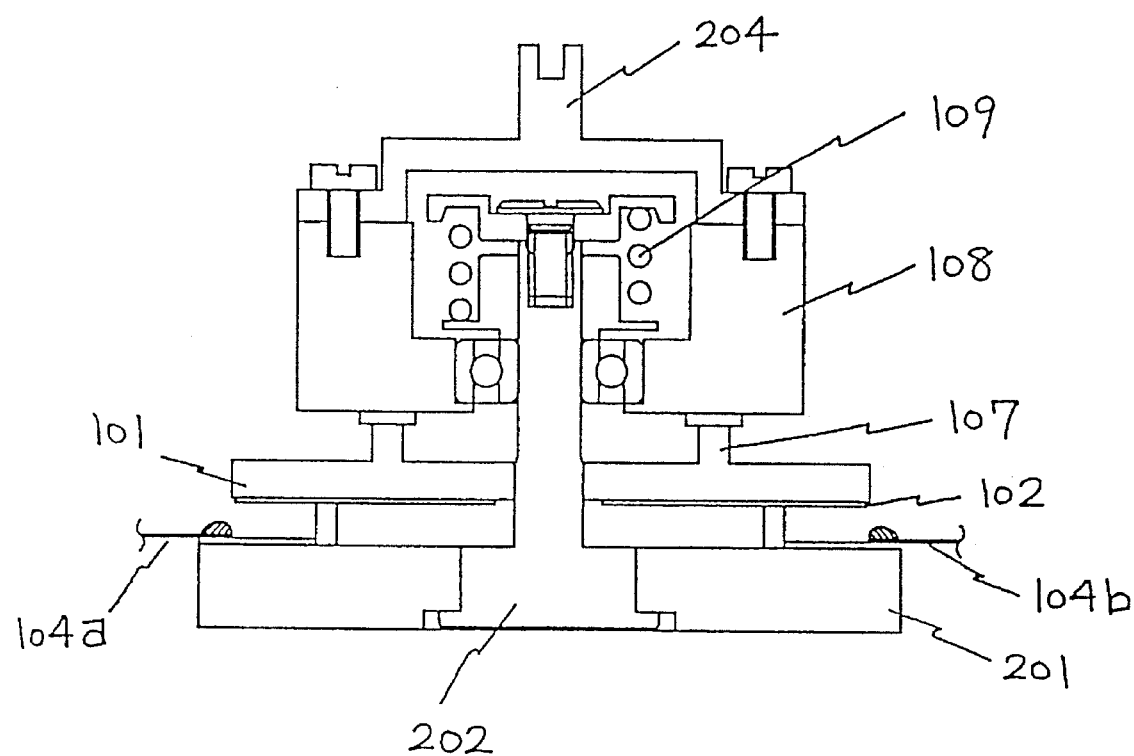
FIG. 19 is a vertical section view of an ultrasonic motor driving apparatus according to a fifth embodiment of the present invention.

FIG. 19 is a vertical section view of an ultrasonic motor driving equipment provided with an ultrasonic motor according to a fifth embodiment of the present invention.

In FIG. 19, a center shaft 202 is base or on a fixing table 201. A piezo-electric element 102 is adhered to a vibrating member 101 and is fixed and supported near a central portion to be integral with a fixing table 201, by the center shaft 202. A moving member 108 has an output shaft 204 and power transmitting means for transmitting torque from the output shaft, such as gears and friction gears, which are not shown in the figure.

The moving member 108 is in contact with the vibrating member 101 at a predetermined pressure due to a pressure regulating spring 109 and can rotate itself. As conducting means to a first electrode pattern 103a and a second electrode pattern 103b, an elastic supporting member 203, which is a supporting member as well as conductive means, is located near the nodal positions except the central part of the vibrating member 101 and the piezo-electric element 102. In this way, electrical conduction to the divided electrode patterns is accomplished without using conductive short-circuit pattern as shown in FIG. 11.

Figure 1:
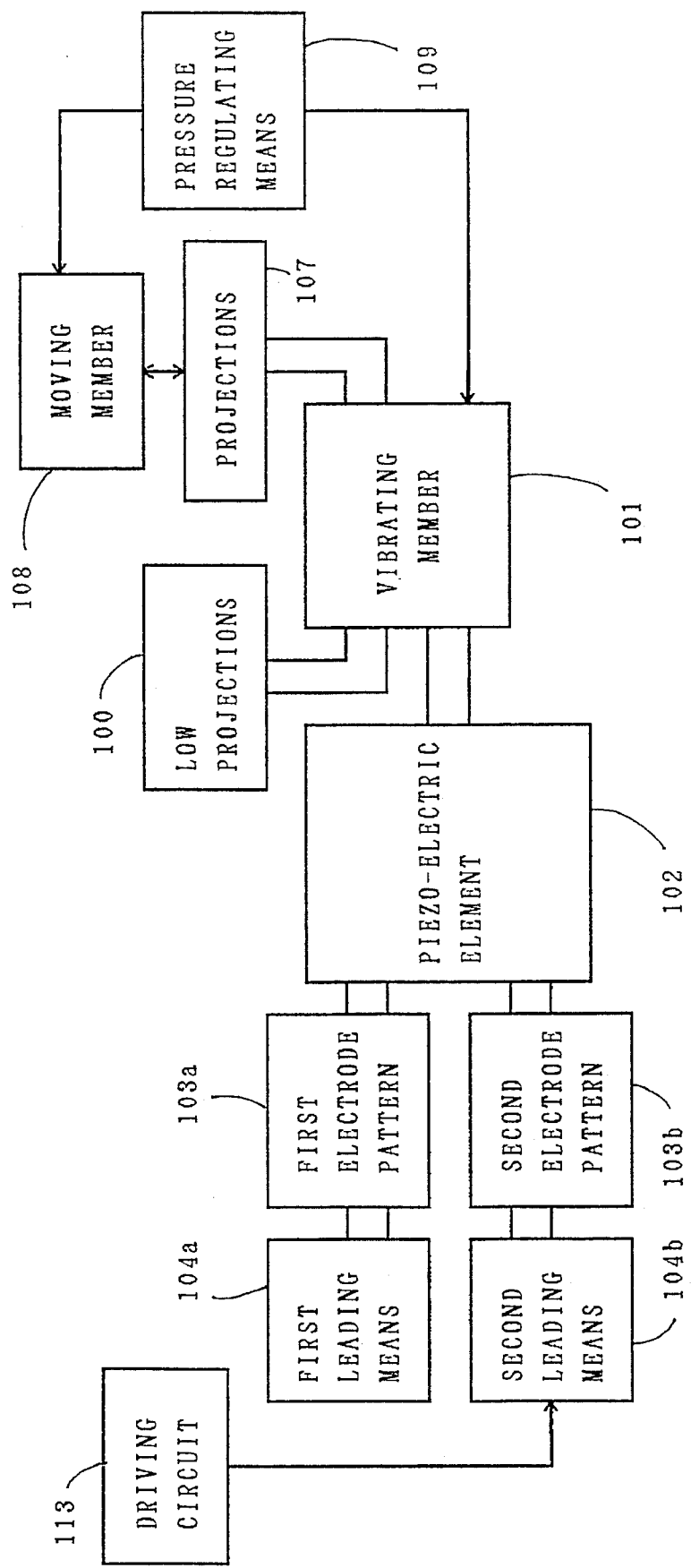
FIG. 1 is a block diagram illustrating an example of the representative construction of an ultrasonic motor according to the present invention.
Figure 2:
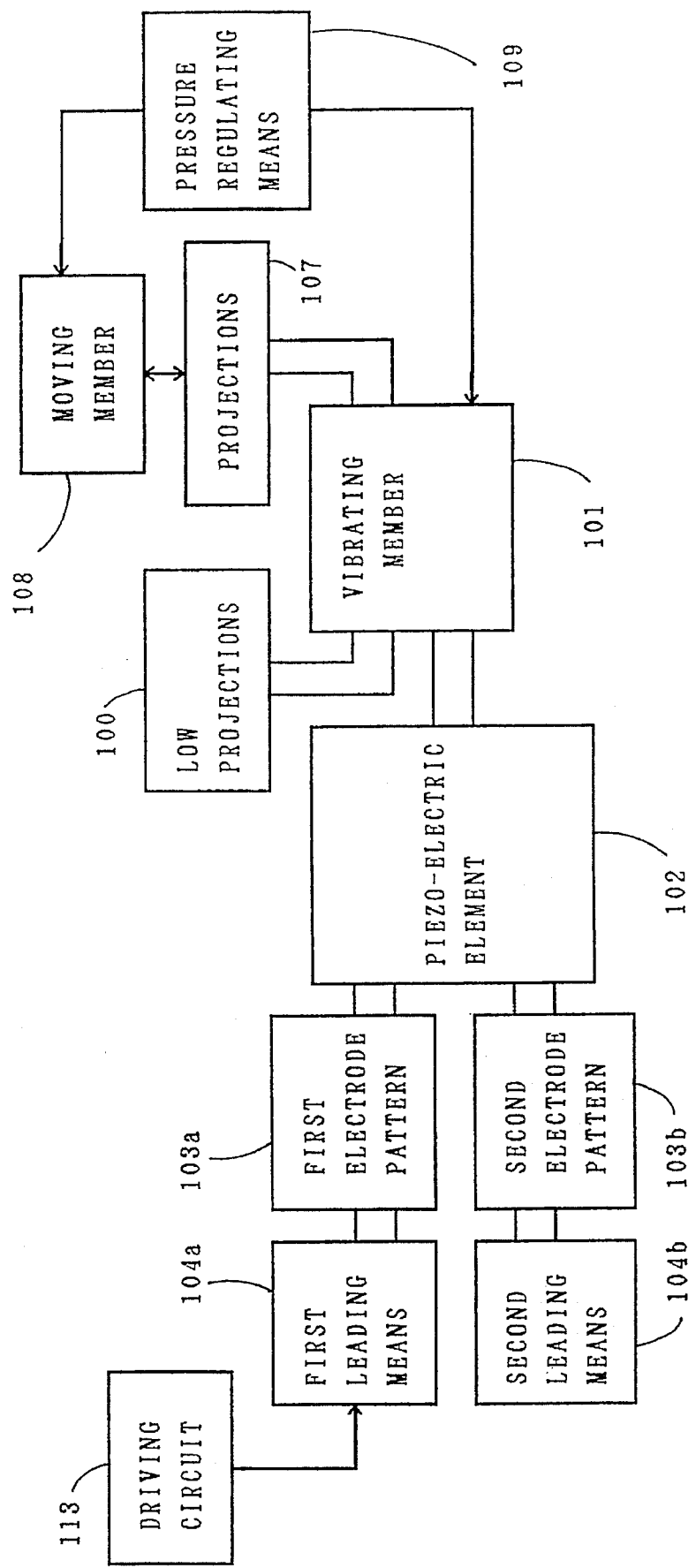
FIG. 2 is a block diagram illustrating an example of the representative construction of an ultrasonic motor according to the present invention.

Here, a driving circuit 113 as shown in FIGS. 1 and 2 applies a driving signal that vibrates the vibrating member 101 and the piezo-electric element 102 in such a way that there is one node except at the central portion in the radial direction, either to the first electrode pattern 103a or to the second electrode pattern 103b. By application of the driving signal, a flexural vibrating wave is generated in the vibrating member, producing rotatory movement, and through an output shaft 204 connected to the moving member 108, and power transmitting means, such as a gear which is not shown in the figure, the output of the ultrasonic motor is generated.

(6) Sixth Embodiment

Figure 20:
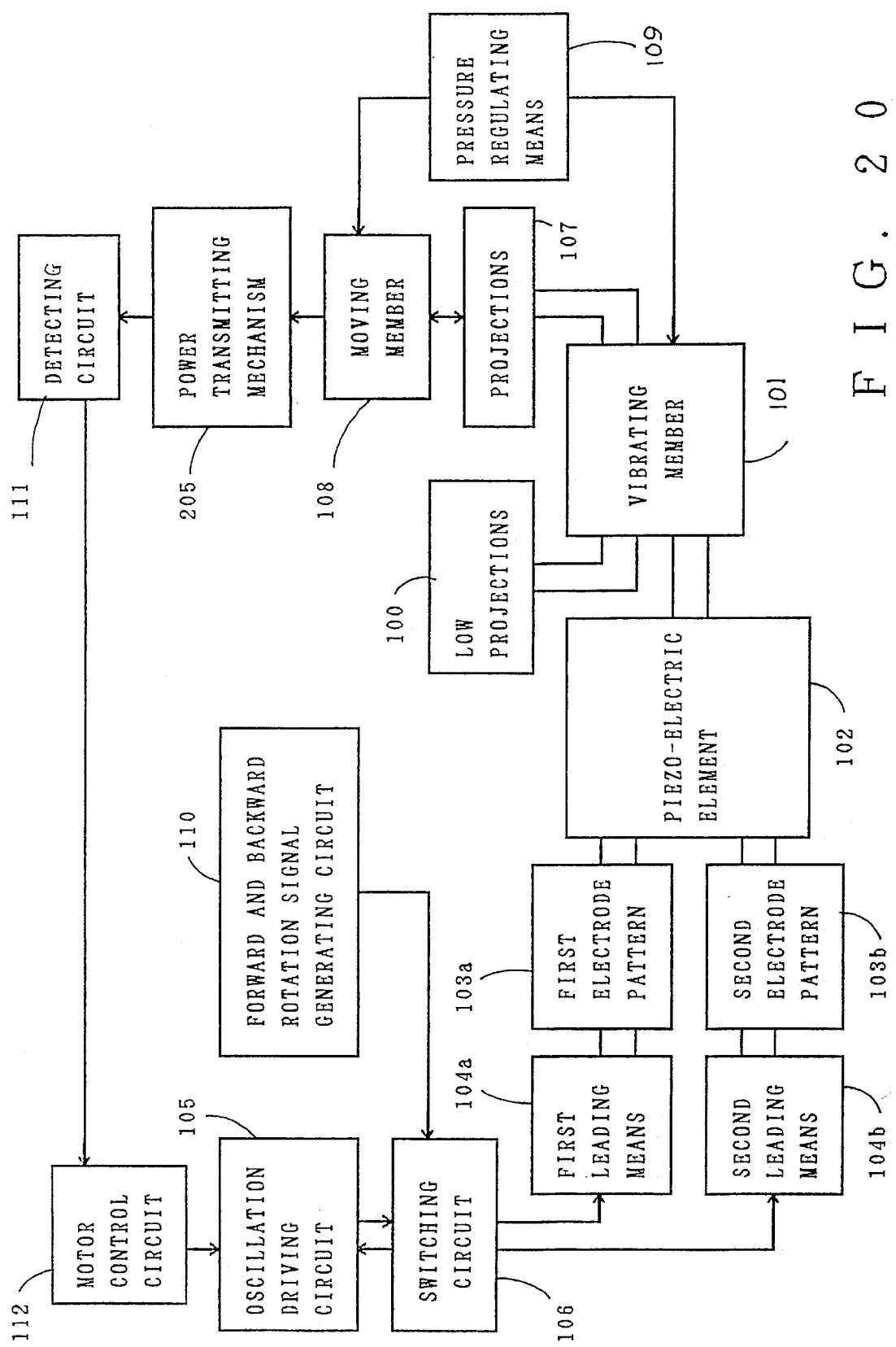
FIG. 20 is a block diagram of an ultrasonic motor according to a sixth embodiment of the present invention.

FIG. 20 is a block diagram of an ultrasonic motor according to a sixth embodiment of the present invention. In FIG. 20, the supporting structure of a vibrating member 101, a piezo-electric element 102 and a vibrating member 101 which is shown in the previous embodiment are utilized.

By way of a forward and backward rotation signal from a forward and backward rotation signal generating means 110 which generates a forward and backward rotation signal to set the direction of rotation for the ultrasonic motor, oscillation data of the vibrating member 101 and the piezo-electric element 102 is detected from a second electrode pattern 103b which is short-circuited by a second leading means or connection 104b. On the basis of the detected oscillation data, in an oscillation driving circuit 105, phase adjustment and amplification are performed and filtering is also performed for facilitating the oscillation of the vibrating member 101 and the piezo-electric element 102 in desired vibrational mode, and then a driving signal is input to a first electrode pattern 103a which is short-circuited by a first leading means or connection 104a. By this driving signal, a flexural vibrating wave is oscillated in the vibrating member 101 and the piezo-electric element 102, and rotatory movement is generated in the moving member 108 which is so positioned as to be in pressing contact with the vibrating member 101 via projections 107 provided thereon by a pressure regulating member 109 such as a coil-spring or sheet spring.

To switch the direction of rotation of the ultrasonic motor, a switching circuit 106 detects oscillation data from the electrode pattern 103a which is short-circuited by the first leading member 104a, and changes leading member of the oscillation driving circuit 105 with the first leading member 104a and the second leading member 104b so that a driving cyclic voltage is applied to the second electrode pattern 103b which is short-circuited by the second leading member 104b.

Furthermore, a detecting circuit 111 detects rotatory data of the moving member 108 from a power transmitting mechanism 205 such as a gear, and a motor control circuit 112 controls the operation of the oscillation driving circuit 105 to determine the driving conditions of the ultrasonic motor.

Figure 21:
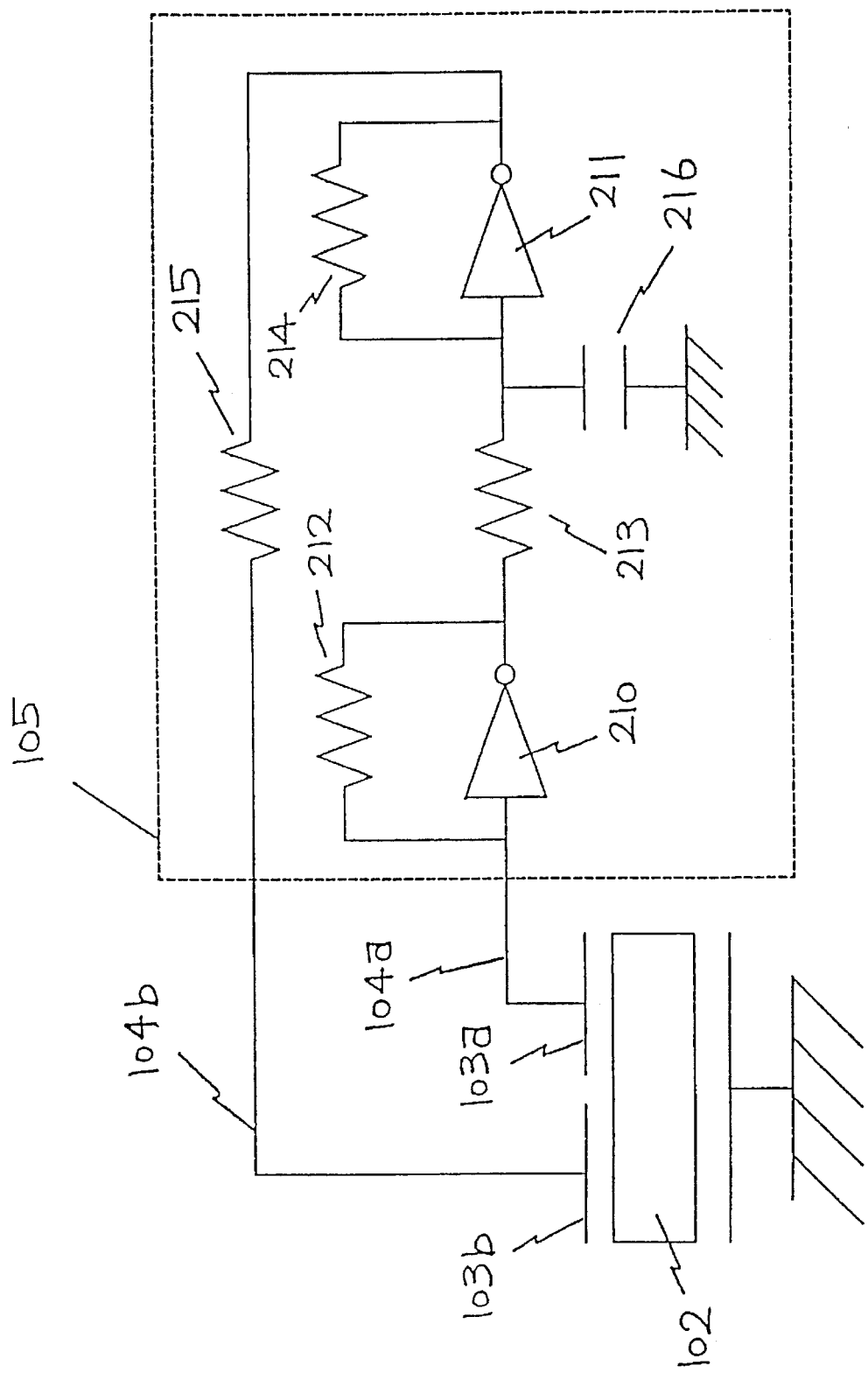
FIG. 21 is a circuit diagram of an oscillation driving circuit of the ultrasonic motor according to the fifth embodiment of the present invention.

FIG. 21 shows a circuit diagram of an oscillation driving circuit 105 which is used in the ultrasonic motor according to this embodiment.

In FIG. 21, the oscillation driving circuit 105 detects oscillation data from the first electrode pattern 103a which is short-circuited by the first leading member 104a. An inverter 210 and a resistor 212 are connected in parallel and perform a reverse amplification of the detected signal. A resistor 213 and a capacitor 216 constitute an integrating circuit. An inverter 211 and a resistor 214 are connected and perform reverse amplification of signals. The resistor 213, the capacitor 216, the inverter 211 and the resistor 214 constitute a phase shifter. A resistor 215 smooths signals.

The oscillation driving circuit 105 performs phase adjustment and amplification. Signals which are smoothed are output as a driving signal to the second electrode pattern 103b which is short-circuited by the second leading member 104b.

By incorporating a filtering circuit, which is not shown in the figure, filtering can also be performed to facilitate the oscillation of the vibrating member 101 and the piezo-electric element 102 in a desired vibration mode.

In this embodiment an inverter is used for reverse amplification, but a similar circuit may be employed by using a buffer or a comparator for non-reverse amplification.

(7) Seventh Embodiment

Figure 22:
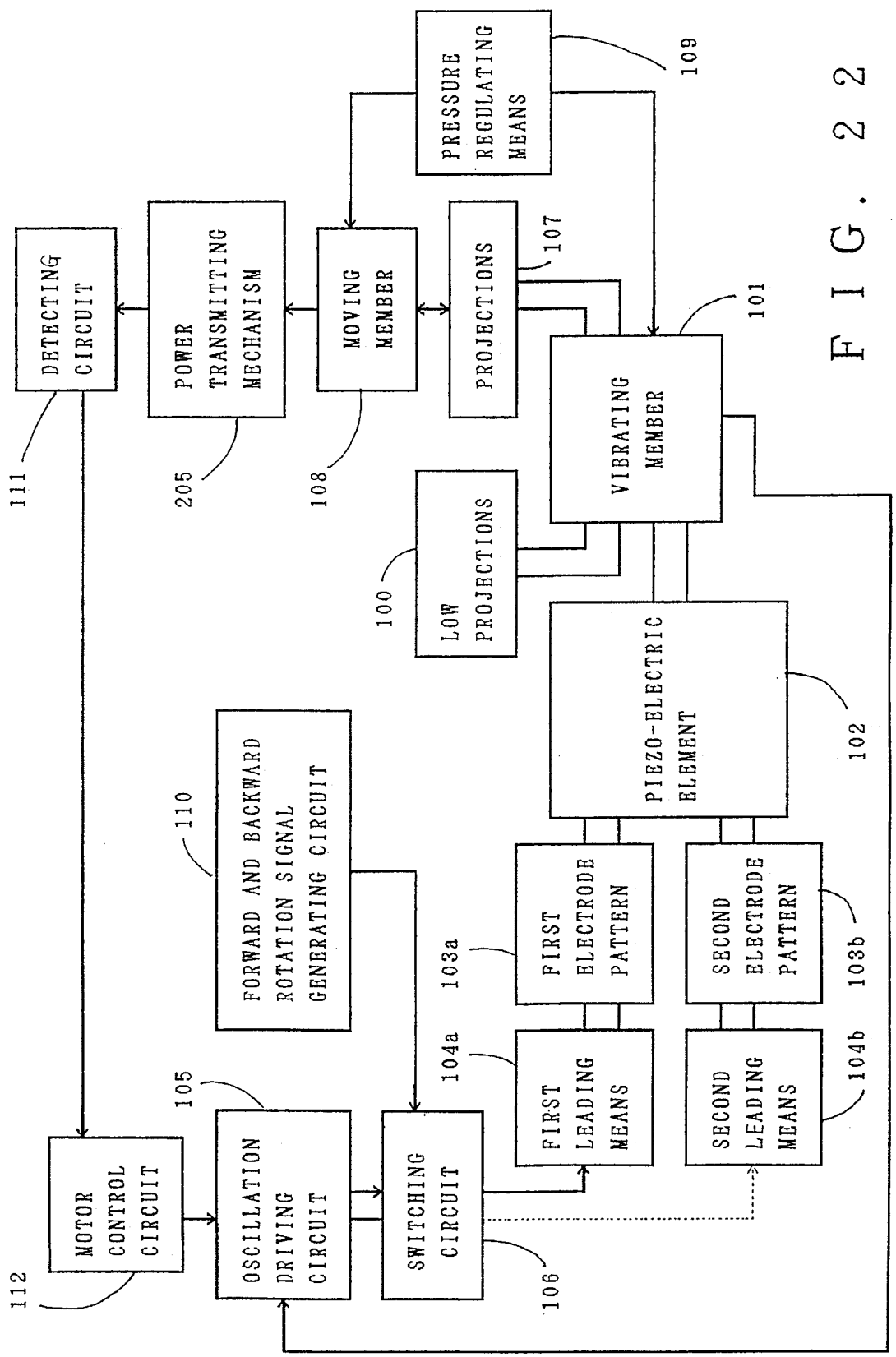
FIG. 22 is a block diagram of an ultrasonic motor according to a seventh embodiment of the present invention.

FIG. 22 is a block diagram of an ultrasonic motor according to a seventh embodiment of this invention. In FIG. 22, the supporting structure of a piezo-electric element 102 and a vibrating member 101 shown in the previous embodiment is utilized.

An oscillation driving circuit 105 is provided which is designed to detect oscillation data of a vibrating member 101 and a piezo-electric element 102 from the vibrating member 101 and to perform phase adjustment and amplification. The driving circuit 105 also inputs a driving signal, which vibrates the vibrating member 101 and the piezo-electric element 102, either to the first electrode pattern 103a which is short-circuited by a first leading member 104a or to the second electrode pattern 103b which is short-circuited by a second leading member 104b. A switching circuit 106 is provided for detecting oscillation data on the basis of output from a forward and backward rotation signal generation circuit 110 as well as for switching the electrode pattern to which a driving signal generated by the oscillation driving circuit 105 is input.

Through a driving signal which the oscillation driving circuit 105 generates, a flexural vibrating wave is oscillated in a vibrating member 101 and the piezo-electric element 102, and rotatory movement is generated in a moving member 108 which is so positioned as to be in pressing contact with the vibrating member 101 via projections 107 which are provided thereon by a pressure regulating member 109 such as a coil-spring or a sheet spring.

Furthermore, a detecting circuit 111 detects rotatory data of the moving member 108 from a power transmitting mechanism 205 such as a gear, and a motor control circuit 112 controls the operation of the oscillation driving circuit 105 to determine the driving conditions of the ultrasonic motor.

Figure 23:
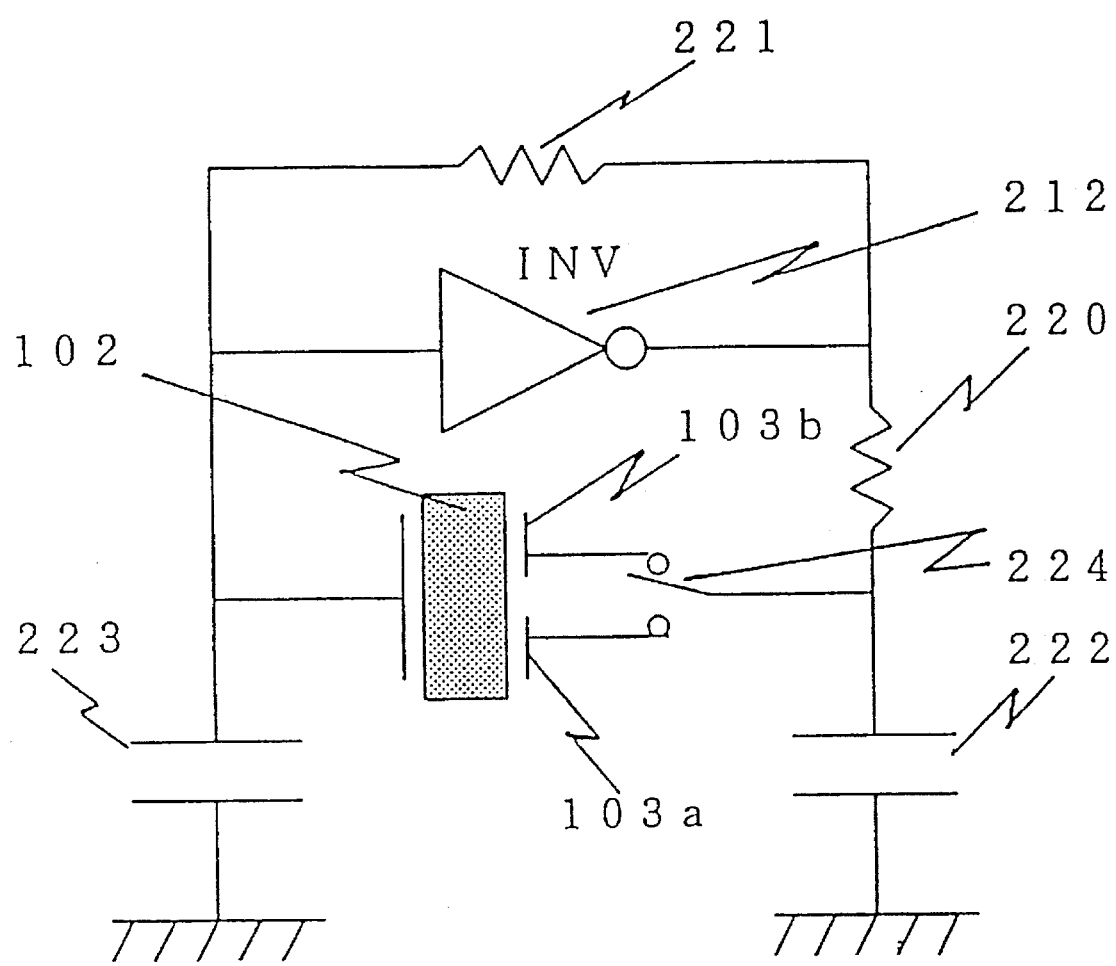
FIG. 23 is a circuit diagram of an oscillation driving circuit of an ultrasonic motor according to a seventh embodiment of the present invention.

FIG. 23 shows a specific circuit diagram of an oscillation driving circuit 105 used in an ultrasonic motor according to this embodiment.

In FIG. 23, the vibrating member 101 is joined to the other plane of the piezo-electric element 102 opposite to the plane on which electrode patterns 103a and 103b are formed, and is electrically connected to the piezo-electric element 102.

The oscillation driving circuit 105 detects oscillation data of the vibrating member 101 and the piezo-electric element from the vibrating member 101 and performs phase adjustment and amplification, as well as inputs a driving signal, which vibrates the vibrating member 101 and the piezo-electric element 102, either to the first electrode pattern 103a which is short-circuited by the first leading member 104a or to the second electrode pattern 103b which is short-circuited by the second leading member 104b. An inverter 212 is connected in parallel with the piezo-electric element 102. The vibrating member 101 detects oscillation data of the vibrating member 101 and the piezo-electric elements 102 as a signal of alternating voltage from either of the first electrode pattern 103a, which is short-circuited by the first leading member 104a, or the second electrode pattern 103b, which is short-circuited by the second leading member 104b and performs reverse amplification. The oscillation driving circuit 105 is comprised of a resistor 221, which is connected in parallel with the inverter 212 to stabilize the operating point of the inverter 212, and capacitors 222 and 223, which are connected in series with input and output terminals respectively of the inverter 212 to adjust the phase in the circuit.

It is also possible to insert a resistor 220 which lowers high-frequency gain between the output terminal of the inverter 212 and the capacitor 222 to control abnormal oscillation.

A switching switch 224 is further provided as a switching circuit 106 which connects the output terminal of the inverter 212 either to the first electrode pattern 103a, which is short-circuited by the first leading member 104a, or to the second electrode pattern 103b, which is short-circuited by the second leading member 104b based on the reversing signals that are output from the forward and backward rotation signal generating circuit 110 which is shown in FIG. 22.

It is also possible to achieve more stable driving of the motor by keeping the values of the capacitors 222 and 223 for phase adjustment in the oscillation driving circuit 105 and the resistor 222 for controlling abnormal oscillation in a variable condition, and adjusting at least either of the capacitor 222, the capacitor 223 or the resistor 220 by using the motor control circuit 112 for driving the motor in a stable condition based on the output signal from the detecting circuit 111 for detecting rotational data of the moving member 108. By detecting ambient temperature driving voltage, and the like along with the rotational data of the moving member 108, at least one among the capacitor 222, the capacitor 223 and the resistor 220 can be adjusted by way of the motor control circuit.

(8) Eighth Embodiment

Figure 24:
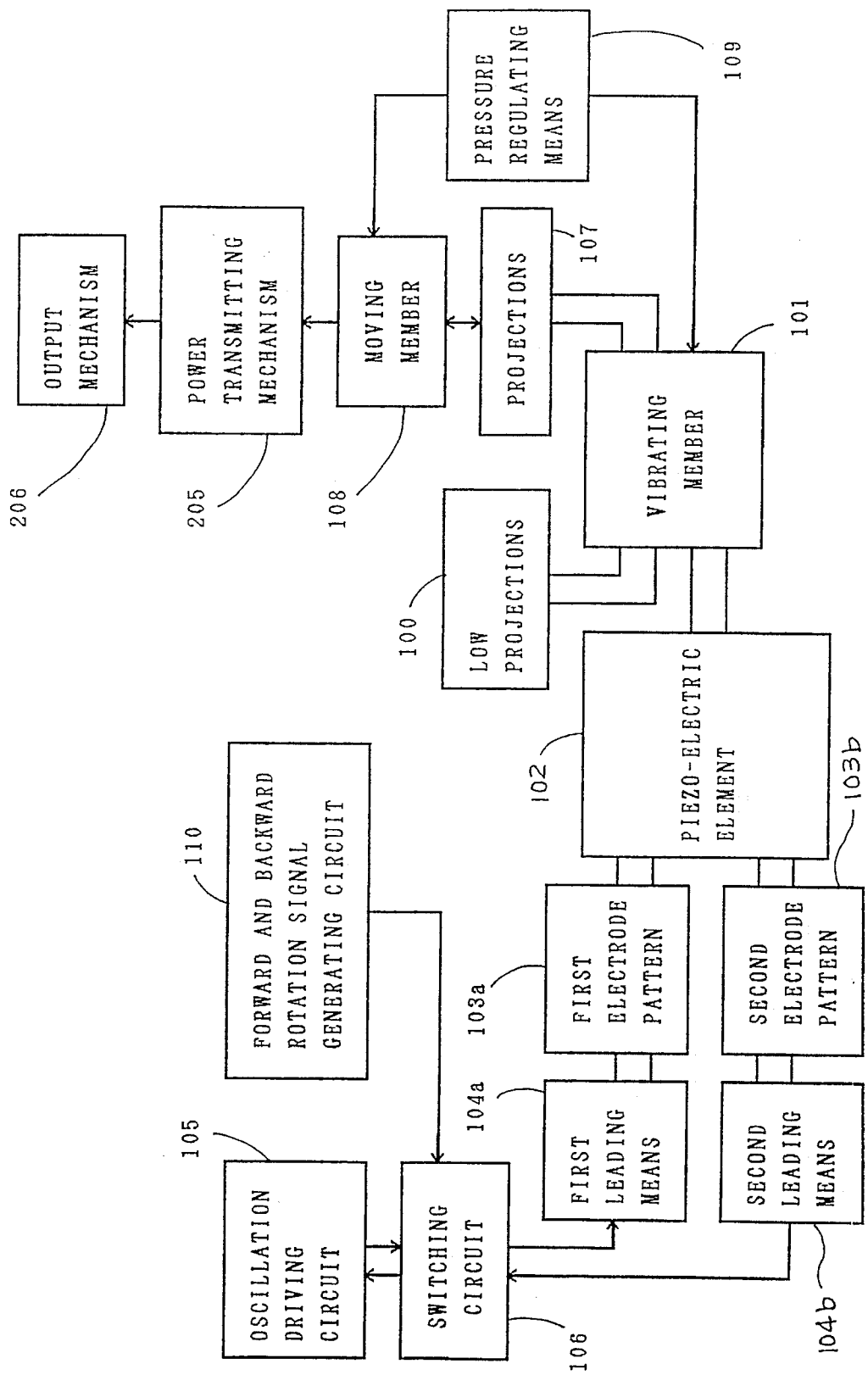
FIG. 24 is a block diagram of electronic apparatus with an ultrasonic motor according to an eighth embodiment of the present invention.

FIG. 24 is a block diagram of an electronic apparatus utilizing an ultrasonic motor according to an eighth embodiment of the present invention.

In FIG. 24, an electronic apparatus with the ultrasonic motor can be constructed by using the ultrasonic motor of the previous embodiments and by providing a power transmitting mechanism 205 such as a gear, which operates in unit with a moving member 108 of the ultrasonic motor, and an output mechanism 206 such as a shaft which operates based on the movement of the power transmitting mechanism 205.

As a power transmitting mechanism 205, a transmitting vehicle such as a gear and a friction wheel or the like is preferably used. As an output mechanism 206, hands or pointer needles are used for electronic timepieces and measuring machines, lens-feed means such as auto-focus are used for camera, tool-feed means and processing member feed means are used for machine tools, and an arm and the like are used for robotics.

Preferable embodiments of the electronic apparatus provided with the ultrasonic motors according to the present invention include an electronic timepiece, a measuring machine, camera, a printer, a printing press, a machine tool, robotics and transferring equipment.

(9) Ninth Embodiment

Figure 25:
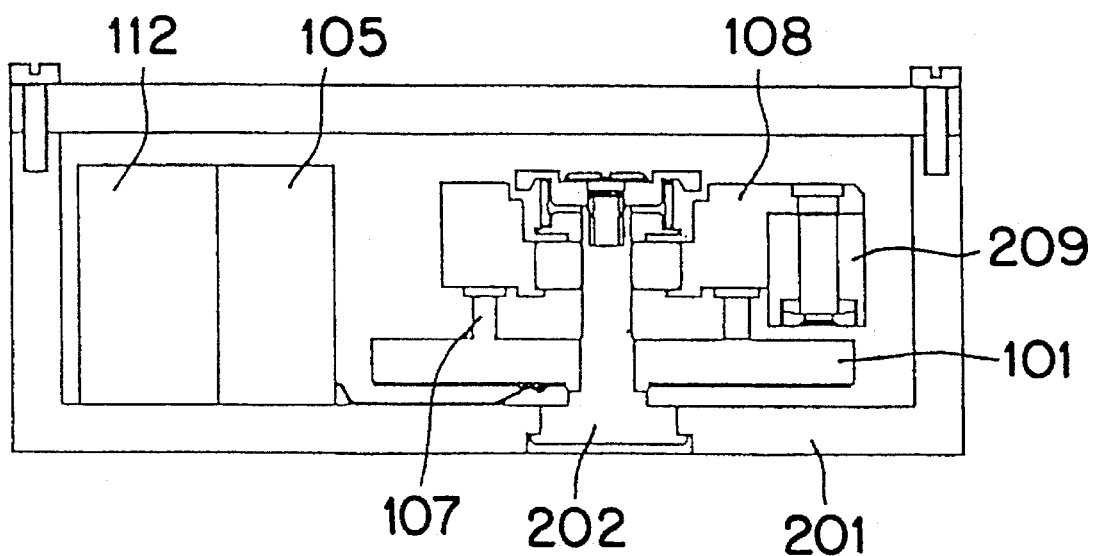
FIG. 25 is a vertical section view of a vibration-generating apparatus with an ultrasonic motor according to a ninth embodiment of the present invention.

FIG. 25 is a vertical section of a ninth embodiment of vibration generating apparatus provided with an ultrasonic motor according to the present invention.

In FIG. 25, the difference between this embodiment and the fifth embodiment of the present invention shown in FIG. 19 is that an eccentricity weight 209 is provided instead of an output shaft 204 in this embodiment. A moving member 108 rotates in unit with the eccentricity weight 209. The moving member 108 and the eccentricity weight 209 of the ultrasonic motor are rotated by a certain signal by receiving radio data or time data from outside, thereby transmitting the data to users by way of vibration.

(10) Tenth Embodiment

Figure 26:
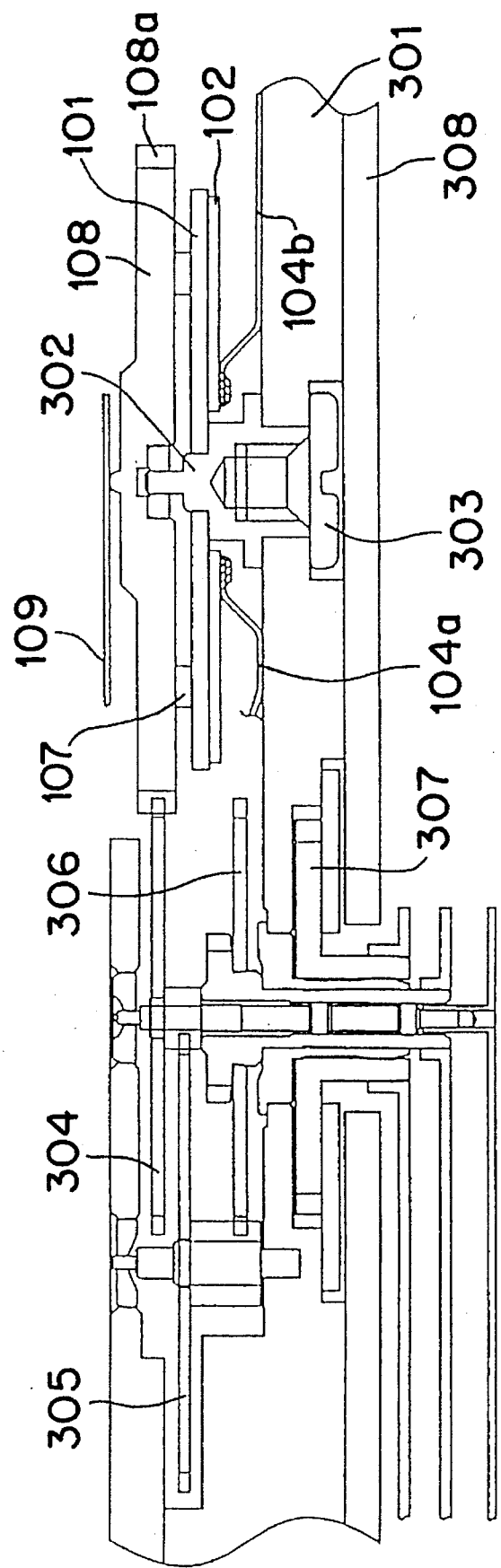
FIG. 26 is a vertical section view of an analog-type electronic timepiece with an ultrasonic motor according to a tenth embodiment of the present invention.

FIG. 26 is a vertical section view of an analog-type electronic timepiece provided with an ultrasonic motor according to a tenth embodiment of the present invention.

In FIG. 26, a vibrating member 101 shown in the previous embodiment is fixed to a guide pin 302, which is screw fastened by a stop screw 303 to a main plate 301. A moving member 108 is brought into contact with a vibrating member 101 via projections 107 by a pressure regulating spring 109 at a predetermined pressure. At the same time, the moving member 108 is guided and rotatably incorporated into the tip 302a of the guide pin 302.

By applying a predetermined cyclic voltage from a motor driving circuit, which is operated by inputting an output signal of a timepiece circuit that is operated with a reference signal output from an oscillating source not shown in the figure, via a first leading means 104a or a second leading means 104b connected to a piezo-electric element 102 to a piezo-electric element 102, the vibrating member 101 undergoes deformation and deformation of the projections 107 rotates the moving member 108 at a predetermined speed.

A moving member gear 108a along the periphery of the moving member 108 rotates a fourth wheel 304, and further rotates a third wheel 305, a center minute wheel 306, a minute wheel not shown in the figure and an hour wheel 307 at predetermined speeds.

If the cycle of the cyclic voltage applied to a piezo-electric element 102 and the numbers of teeth of the above-mentioned wheels are suitably selected, the hours are indicated by an hour hand that is attached to an hour wheel, the minutes are indicated by a minute hand attached to the center minute wheel and the seconds are indicated by a second hand attached to the fourth wheel.

In addition to being indicated by a train of a plurality of wheels and the hands as described above, the time data can also be indicated by attaching hands or pointer needles directly to the moving member 108. Time can be viewed from the side of dial 308 as well as from the side of the pressure regulating spring 109.

By adjusting a driving signal output to the piezo-electric element 102 from the motor driving circuit through the motor control circuit, the second hand can be stepwisely moved for every second or can be continuously moved.

In addition to time data, calendar information such as year, month and day, the remaining capacity of a battery, environmental information and tricks can be indicated.

(11) Eleventh Embodiment

Figure 27:
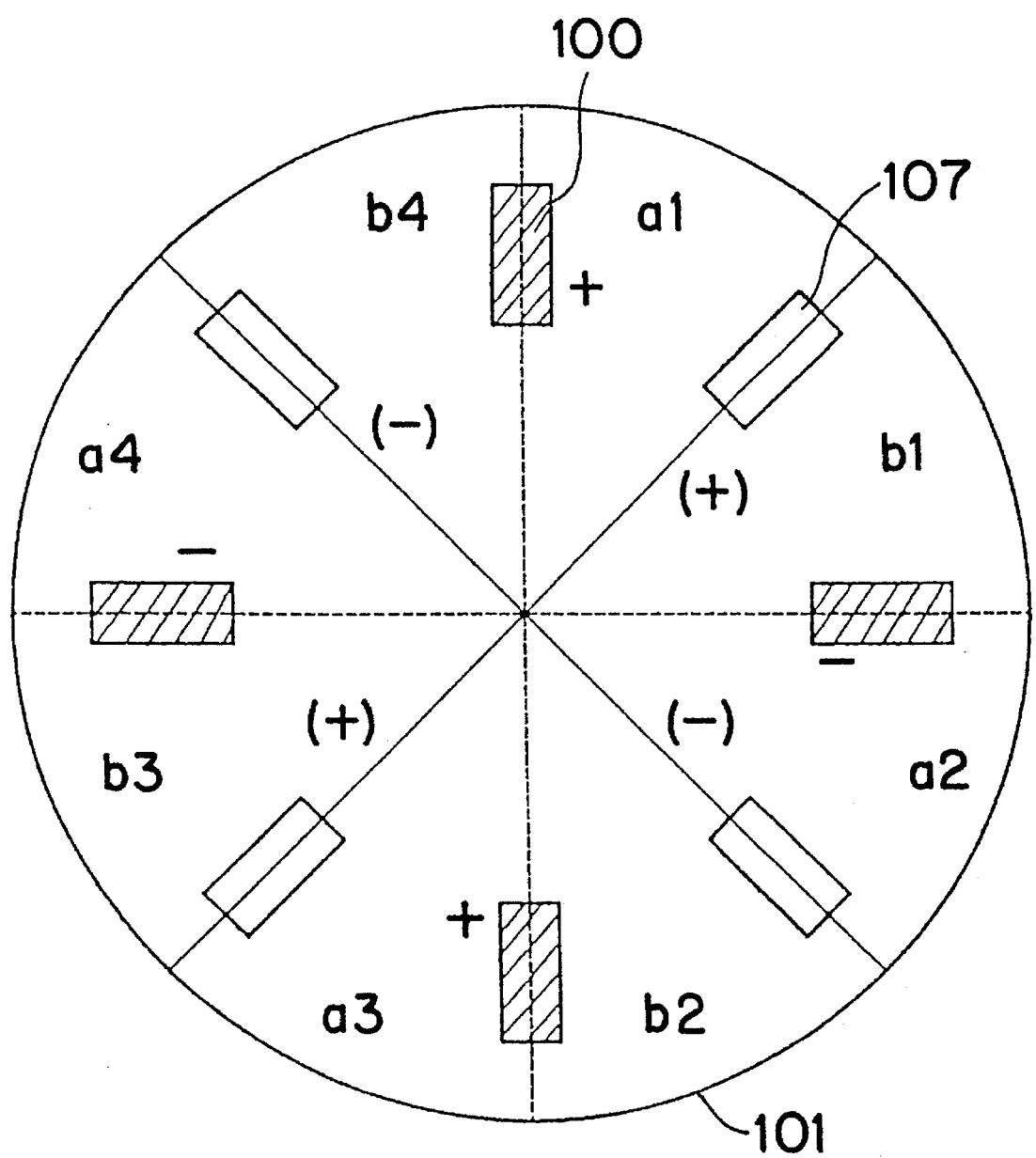
FIG. 27 is a plane view of a vibrating member of an ultrasonic motor according to an eleventh embodiment of the present invention.
Figure 28:
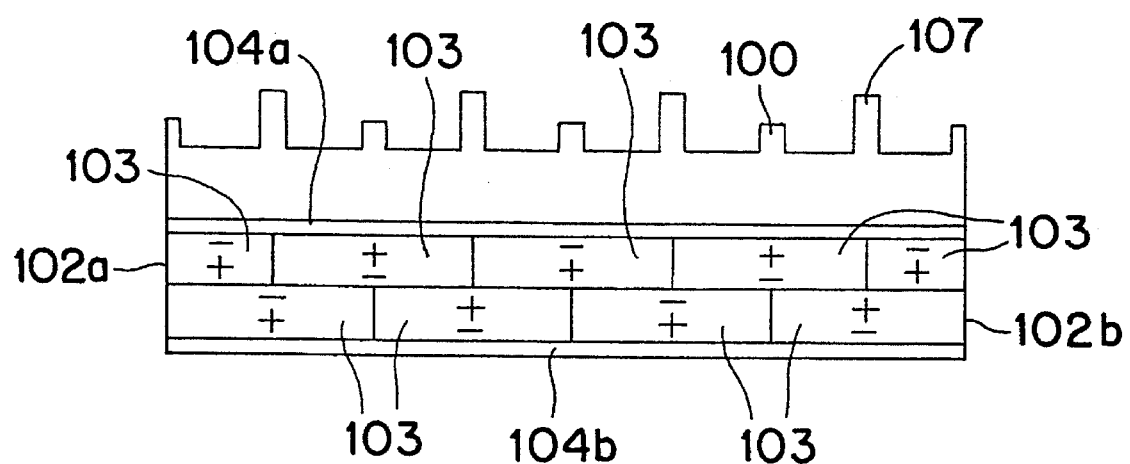
FIG. 28 is a vertical section view of the vibrating member of the ultrasonic motor according to the eleventh embodiment of the present invention.
Figure 29:
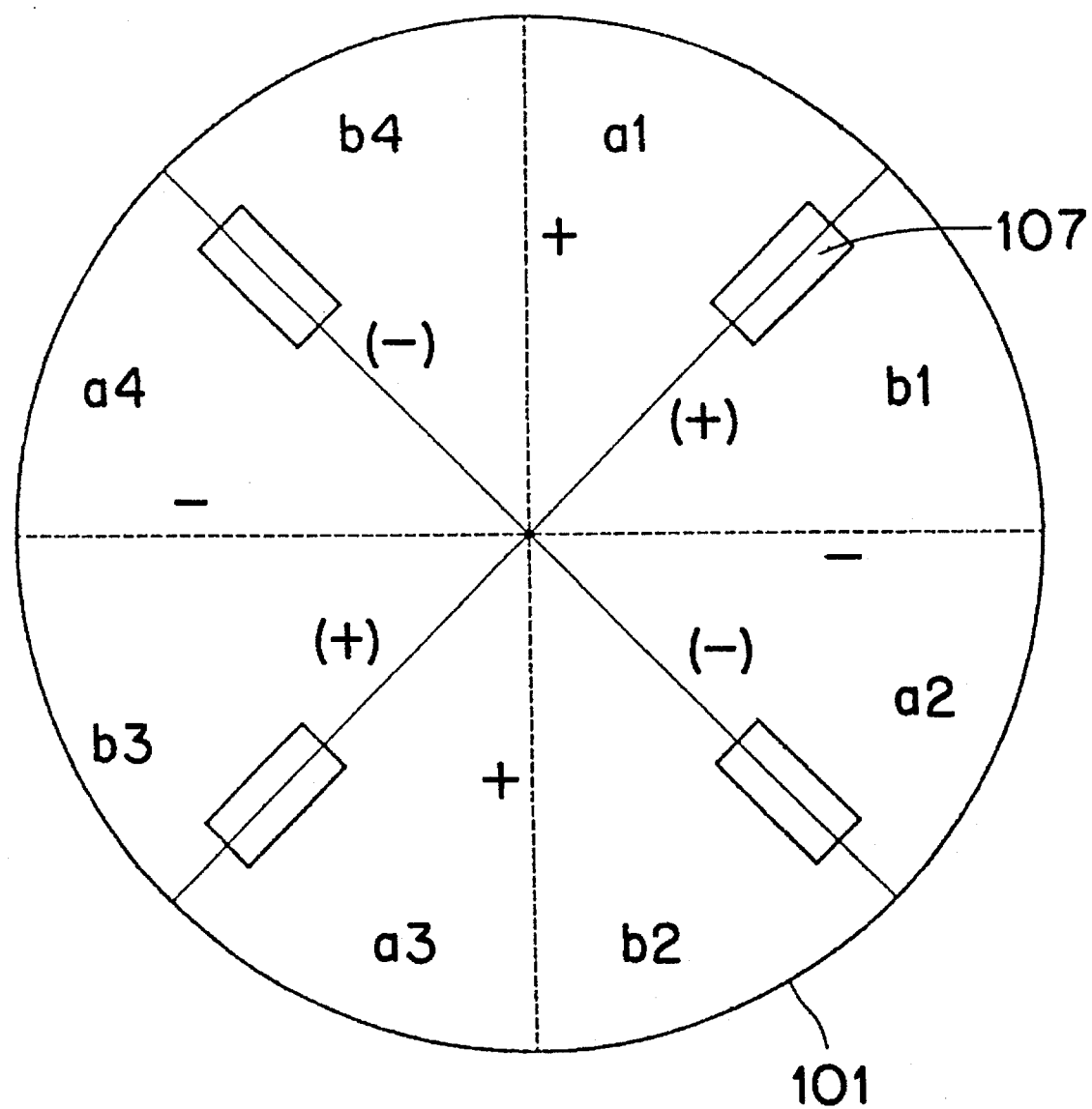
FIG. 29 is a plane view of a conventional ultrasonic motor.
Figure 30:
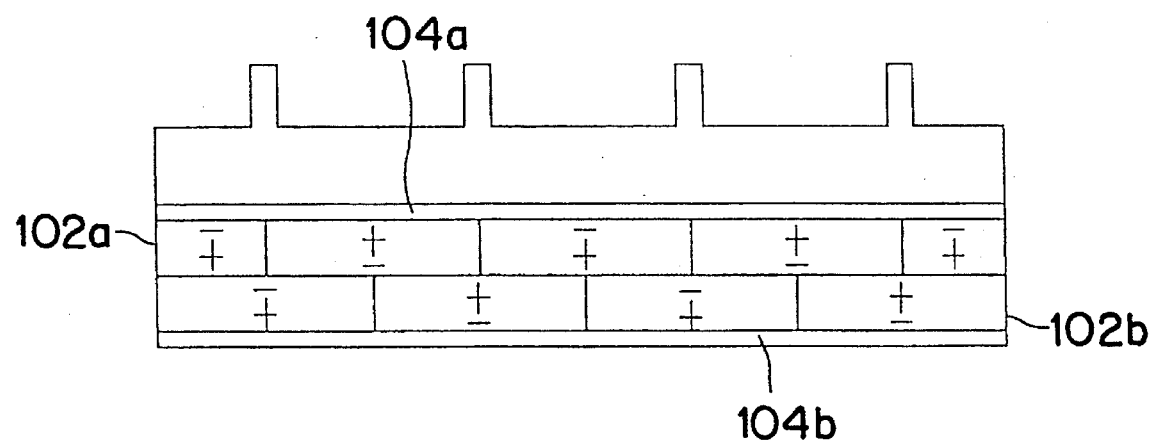
FIG. 30 is a vertical section view of a conventional ultrasonic motor.

FIGS. 27 and 28 are a plane view and a vertical section view respectively of a vibrating member of an ultrasonic motor according to an eleventh embodiment of the present invention.

In FIG. 27 and FIG. 28, in this embodiment, two laminated piezo-electric elements are used to constitute the vibrating member of the first embodiment of the present invention.

Piezo-electric elements 102a and 102b are almost equally divided into four segments with the neighboring segments thereof being oppositely polarized as diagrammed to form electrode patterns 103 thereon, and laminated in a manner that the electrode pattern 103 on one piezo-electric element 102a and the electrode pattern 103 on the other piezo-electric element 102b are deviated by a half pitch and joined to the vibrating member 101.

On one plane of the vibrating member 101, projections 107 are arranged to transmit power to the moving member 108 near every other one of the boundaries of electrode patterns 103 of either the piezo-electric element 102a or piezo-electric element 102b. Low projections 100 of the same shape as, but of lower height than, the projections 107 are arranged near every one of the boundaries of electrode patterns 103 of either the piezo-electric elements 102a or piezo-electric elements 102b other than at the boundaries near which projections 107 are arranged.

In an ultrasonic motor according to the present invention, by arranging projections to transmit power to the vibrating member near every other one of the boundaries of the divided patterns of piezo-electric elements on the plane of the vibrating member and providing lower projections which do not transmit power to the moving member at every intermediate position between higher projections, more stable vibration of the vibrating member and the piezo-electric element as well as stabilization against environmental changes during drive of the ultrasonic motor are fulfilled.

What is claimed is:

1. An ultrasonic motor comprising: a piezo-electric element having first and second surfaces; a plurality of electrode patterns divided into first and second electrode pattern groups disposed on the first surface of the piezo-electric element; first circuit means for short-circuiting every one of the electrode patterns in the first electrode pattern group; second circuit means for short-circuiting every one of the electrode patterns in the second electrode pattern group; a vibrating member disposed on the second surface of and electrically connected to the piezo-electric element; a moving member movably disposed on the vibrating member; first projections disposed on a surface of the vibrating member near some of the boundaries of the electrode patterns of the piezo-electric element for frictionally driving the moving member by expansion and contraction movement of the piezo-electric element; second projections provided at each intermediate position between the first projections for adjusting the vibrating conditions of the vibrating member, the second projections having a different height from the first projections, whereby the second projections do not frictionally drive the moving member; a pressure-regulating member for urging the moving member into pressure contact with the vibrating member at a predetermined pressure; and oscillation driving means for detecting oscillation data of the vibrating member and the piezo-electric element, performing phase adjustment and amplification of a vibrating wave generated by the piezo-electric element, and inputting a driving signal to either the electrode pattern short-circuited by the first circuit means or the electrode pattern short-circuited by the second circuit means for effecting vibration of the vibrating member and the piezo-electric element.

2. An ultrasonic motor as claimed in claim 1; wherein the second projections are of the same shape as but lower in height than the first projections.

3. An ultrasonic motor as claimed in claim 2; wherein the second projections are provided in an odd number at equal intervals between the first projections.

4. An ultrasonic motor as claimed in claim 1; wherein the second projections are provided in an odd number at equal intervals between the first projections.

5. An ultrasonic motor as claimed in claim 1; further comprising a base; a shaft fixed to the base, the vibrating member being connected to the shaft; and a driving circuit for inputting a driving signal to one of the electrode pattern groups to vibrate the vibrating member and the piezo-electric element.

6. An ultrasonic motor as claimed in claim 5; wherein the vibrating member comprises a disc-shaped elastic material fixed at a central portion thereof to the shaft.

7. An analog-type electronic timepiece comprising:

an ultrasonic motor having a piezo-electric element having first and second surfaces; a plurality of electrode patterns divided into first and second electrode pattern groups disposed on the first surface of the piezo-electric element; first circuit means for short-circuiting every one of the electrode patterns of the first electrode pattern group; second circuit means for short-circuiting every one of the electrode patterns of the second electrode pattern group; a vibrating member disposed on the second surface of and electrically connected to the piezo-electric element; a moving member movably disposed on the vibrating member; first projections disposed on a surface of the vibrating member near some of the boundaries of the electrode patterns of the piezo-electric element for frictionally driving the moving member by expansion and contraction movement of the piezo-electric element; second projections provided at each intermediate position between the first projections for adjusting the vibrating conditions of the vibrating member, the second projections having a different height from the first projections, whereby the second projections do not frictionally drive the moving member; and a pressure-regulating member for urging the moving member into pressure contact with the vibrating member at a predetermined pressure;

oscillation driving circuit means for detecting oscillation data from either the electrode patterns short-circuited by the first circuit means or the electrode patterns short-circuited by the second circuit means, performing phase adjustment and amplification of vibrating wave generated by the piezo-electric element, and inputting a driving signal to either the electrode pattern short-circuited by the first circuit means or the electrode pattern short-circuited by the second circuit means;

means for generating a time base reference signal;

timepiece circuit means receptive of the time base reference signal for producing a time signal representative of time;

motor driving circuit means responsive to the time signal for outputting a driving signal to the piezo-electric element of the ultrasonic motor for driving the ultrasonic motor; and display means driven by the ultrasonic motor for displaying time.

8. An ultrasonic motor comprising: a piezo-electric element having first and second surfaces; a plurality of electrode patterns disposed on the first surface of the piezo-electric element at nearly equal intervals in a multiple of four, each pair of two neighboring electrode patterns corresponding to a region of the piezo-electric element having an alternately reversed direction of polarization; first and second circuit means for short-circuiting every other one of the electrode patterns to form two electrode pattern groups; a vibrating member disposed on the second surface of and electrically connected to the piezo-electric element; a moving member movably disposed on the vibrating member; first projections disposed on a surface of the vibrating member near every other one of the boundaries of the electrode patterns of the piezo-electric element for frictionally driving the moving member by expansion and contraction movement of the piezo-electric element; second projections provided at each intermediate position between the first projections for adjusting the vibrating conditions of the vibrating member, the second projections having a different height from the first projections, whereby the second projections do not frictionally drive the moving member; a pressure-regulating member for urging the moving member into pressure contact with the vibrating member at a predetermined pressure; and oscillation driving means for detecting oscillation data of the vibrating member and the piezo-electric element, performing phase adjustment and amplification of a vibrating wave generated by the piezo-electric element, and inputting a driving signal which vibrates the vibrating member and the piezo-electric element to either the electrode pattern short-circuited by the first circuit means or the electrode pattern short-circuited by the second circuit means.

9. An ultrasonic motor as claimed in claim 8; further comprising detecting means for detecting motion data from the moving member; and a control circuit for controlling the operation of the oscillation driving circuit means to determine the driving conditions of the ultrasonic motor based on the detected data from the detecting means.

10. An ultrasonic motor as claimed in claim 8; wherein the oscillation driving means comprises an inverter for inverting and amplifying an electric signal representative of oscillation data of the vibrating member and the piezo-electric element, the inverter having an output terminal connected in parallel with one of the electrode patterns short-circuited by the first circuit means or with one of the electrode patterns short-circuited by the second circuit means, a feedback resistor connected in parallel with the inverter for stabilizing the operation point of the inverter and capacitors connected in series with input and output terminals, respectively, for adjusting phases of a vibrating wave generated by the piezo-electric element.

11. An ultrasonic motor as claimed in claim 8; further comprising forward and backward rotation signal generating means for generating the reversing signal to set a rotary direction for the ultrasonic motor; and switching means for switching the electrode pattern to which a driving signal output from the oscillating driving circuit is input according to the reversing signal generated by the forward and backward rotation signal generating means.

12. An ultrasonic motor as claimed in claim 8; wherein the oscillation driving means detects oscillation data from one of the electrode patterns short-circuited by the first circuit means and one of the electrode patterns short-circuited by the second circuit means.

13. An ultrasonic motor as claimed in claim 8; further comprising forward and backward rotation signal generating means for generating a forward and backward rotation signal to set a rotary direction for the ultrasonic motor.

14. An ultrasonic motor as claimed in claim 13; further comprising switching means for switching between the application of a driving cyclic voltage and the detection of oscillation data for each of the electrode patterns short-circuited by the first circuit means and the electrode patterns short-circuited by the second circuit means through the forward and backward rotation signal from the forward and backward rotation signal generating means.

15. An ultrasonic motor comprising:

a plurality of piezo-electric elements having a surface provided with electrode patterns divided into almost equal segments in multiples of two;

circuit means for short-circuiting the electrode patterns of the piezo-electric elements;

a vibrating member disposed on the piezo-electric elements in such a manner that one of the electrode patterns on one of the piezo-electric elements and one of the electrode patterns on another of the piezo-electric elements deviate by a half pitch;

a moving member movably disposed on the vibrating member;

a base;

a center shaft fixed to the base and supporting the vibrating member;

first projections disposed on a surface of the vibrating member near every other one of the boundaries of the electrode patterns of the piezo-electric elements for frictionally driving the moving member;

second projections provided at each intermediate position between the first projections to adjust vibrating conditions of the vibrating member, the second projections being provided near all of the boundaries of the electrode patterns other than the boundaries near which the first projections are provided, the second projections having a different height from the first projections, whereby the second projections do not frictionally drive the moving member;

a pressure-regulating member for urging the moving member into pressure contact with the vibrating member at a predetermined pressure; and oscillation driving means for detecting oscillation data of the vibrating member and the piezo-electric element, performing phase adjustment and amplification of a vibrating wave generated by the piezo-electric elements, and inputting a driving signal to the circuit means for effecting vibration of the vibrating member and the piezo-electric elements.

16. An ultrasonic motor driving device comprising:

an ultrasonic motor having a piezo-electric element having first and second surfaces; a plurality of electrode patterns disposed on the first surface of the piezo-electric element at nearly equal intervals in a multiple of four, each pair of two neighboring electrode patterns corresponding to a region of the piezo-electric element having an alternately reversed direction of polarization; first and second circuit means for short-circuiting every other one of the electrode patterns to form two electrode pattern groups; a vibrating member disposed on the second surface of and electrically connected to the piezo-electric element; a moving member movably disposed on the vibrating member; first projections disposed on a surface of the vibrating member near every other one of the boundaries of the electrode patterns of the piezo-electric element for frictionally driving the moving member by expansion and contraction movement of the piezo-electric element; second projections provided at each intermediate position between the first projections for adjusting the vibrating conditions of the vibrating member, the second projections having a different height from the first projections, whereby the second projections do not frictionally drive the moving member; and a pressure-regulating member for urging the moving member into pressure contact with the vibrating member at a predetermined pressure;

oscillation driving circuit means for detecting oscillation data from either the electrode patterns short-circuited by the first circuit means or the electrode patterns short-circuited by the second circuit means, performing phase adjustment and amplification of vibrating wave generated by the piezo-electric element, and inputting a driving signal to either the electrode pattern short-circuited by the first circuit means or the electrode pattern short-circuited by the second circuit means;

an output shaft connected to be driven by the moving member; and power transmitting means for transmitting output torque from the output shaft to a load.

17. An ultrasonic motor driving device as claimed in claim 16; further comprising detecting means for detecting rotary data of the power transmitting means; and a control circuit for controlling the operation of the oscillation driving circuit to determine the driving conditions of the ultrasonic motor by the data detected from the detecting means.

18. An analog-type electronic timepiece comprising:

an ultrasonic motor having a piezo-electric element having first and second surfaces; a plurality of electrode patterns disposed on the first surface of the piezo-electric element at nearly equal intervals in a multiple of four, each pair of two neighboring electrode patterns corresponding to a region of the piezo-electric element having an alternately reversed direction of polarization; first and second circuit means for short-circuiting every other one of the electrode patterns to form two electrode pattern groups; a vibrating member disposed on the second surface of and electrically connected to the piezo-electric element; a moving member movably disposed on the vibrating member; first projections disposed on a surface of the vibrating member near every other one of the boundaries of the electrode patterns of the piezo-electric element for frictionally driving the moving member by expansion and contraction movement of the piezo-electric element; second projections provided at each intermediate position between the first projections for adjusting the vibrating conditions of the vibrating member, the second projections having a different height from the first projections, whereby the second projections do not frictionally drive the moving member; and a pressure-regulating member for urging the moving member into pressure contact with the vibrating member at a predetermined pressure;

oscillation driving circuit means for detecting oscillation data from either the electrode patterns short-circuited by the first circuit means or the electrode patterns short-circuited by the second circuit means, performing phase adjustment and amplification of vibrating wave generated by the piezo-electric element, and inputting a driving signal to either the electrode pattern short-circuited by the first circuit means or the electrode pattern short-circuited by the second circuit means;

means for generating a time base reference signal;

timepiece circuit means receptive of the time base reference signal for producing a time signal representative of time;

motor driving circuit means responsive to the time signal for outputting a driving signal to the piezo-electric element of the ultrasonic motor for driving the ultrasonic motor; and display means driven by the ultrasonic motor for displaying time.

19. An ultrasonic motor having a moving member frictionally driven by vibrational movement of a piezo-electric element, the ultrasonic motor comprising:

at least one piezo-electric element having first and second surfaces;

a plurality of electrode patterns disposed on the first surface of the piezo-electric element and operative when energized to effect expansion and contraction of the piezo-electric element;

circuit means for short-circuiting the electrode patterns of the piezo-electric element;

a vibrating member connected to the second surface of the piezo-electric element to undergo vibrational movement in response to expansion and contraction of the piezo-electric element;

a moving member movably disposed on the vibrating member;

first driving means disposed on a surface of the vibrating member for frictionally driving the moving member in response to vibrational movement of the vibrating member, the first driving means comprising a plurality of first projections disposed on the surface of the vibrating member near every other one of the boundaries of the electrode patterns of the piezo-electric element;

second driving means disposed on the vibrating member for adjusting the vibrating conditions of the vibrating member, the second driving means comprising a plurality of second projections disposed at each intermediate position between the first projections, the second projections being provided near all of the boundaries of the electrode patterns other than the boundaries near which the first projections are provided;

pressure regulating means for contacting the moving member with the vibrating member at a predetermined pressure; and oscillation driving means for detecting oscillation data of the vibrating member and the piezo-electric element, performing phase adjustment and amplification of a vibrating wave generated by the piezo-electric element, and inputting a driving signal to the circuit means for effecting vibration of the vibrating member and the piezo-electric element.

20. An ultrasonic motor as claimed in claim 19; wherein the second projections are provided in an odd number at equal intervals between the first projections.

21. An ultrasonic motor as claimed in claim 19; wherein the second projections have a different height from the first projections, whereby the second projections do not frictionally drive the moving member.

22. An ultrasonic motor as claimed in claim 21; wherein the second projections are lower in height than the first projections.

23. An ultrasonic motor driving device comprising: an ultrasonic motor having a piezo-electric element having first and second surfaces; a plurality of electrode patterns divided into first and second electrode pattern groups disposed on the first surface of the piezo-electric element; first circuit means for short-circuiting every one of the electrode patterns in the first electrode pattern group; second circuit means for short-circuiting every one of the electrode patterns in the second electrode pattern group; a vibrating member disposed on the second surface of and electrically connected to the piezo-electric element; a moving member movably disposed on the vibrating member; first projections disposed on a surface of the vibrating member near some of the boundaries of the electrode patterns of the piezo-electric element for frictionally driving the moving member by expansion and contraction movement of the piezo-electric element; second projections provided at each intermediate position between the first projections for adjusting the vibrating conditions of the vibrating member, the second projections having a different height from the first projections, whereby the second projections do not frictionally drive the moving member; and a pressure-regulating member for urging the moving member into pressure contact with the vibrating member at a predetermined pressure;

oscillation driving circuit means for detecting oscillation data from either the electrode patterns short-circuited by the first circuit means or the electrode patterns short-circuited by the second circuit means, performing phase adjustment and amplification of vibrating wave generated by the piezo-electric element, and inputting a driving signal to either the electrode pattern short-circuited by the first circuit means or the electrode pattern short-circuited by the second circuit means;

an output shaft connected to be driven by the moving member; and power transmitting means for transmitting output torque from the output shaft to a load.

* * * * *